US010159041B2

(12) United States Patent
Sakai et al.

(10) Patent No.: US 10,159,041 B2
(45) Date of Patent: Dec. 18, 2018

(54) COMMUNICATION APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventors: Tomoya Sakai, Kawasaki (JP); Kazuya Taniguchi, Kawasaki (JP); Kensuke Yasuma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/286,631

(22) Filed: Oct. 6, 2016

(65) Prior Publication Data

US 2017/0111859 A1    Apr. 20, 2017

(30) Foreign Application Priority Data

Oct. 15, 2015  (JP) ................. 2015-203985

(51) Int. Cl.
*H04W 52/02* (2009.01)
*H04W 4/80* (2018.01)

(52) U.S. Cl.
CPC ......... *H04W 52/0212* (2013.01); *H04W 4/80* (2018.02); *H04W 52/0229* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/166* (2018.01); *Y02D 70/22* (2018.01)

(58) Field of Classification Search
CPC ...................... H04W 52/0212; H04W 52/0229

USPC ........... 455/574, 571, 522, 69, 67.11, 552.1, 455/550.1
See application file for complete search history.

(56) References Cited

U.S. PATENT DOCUMENTS

| 8,188,917 B2* | 5/2012 | Gronemeyer ........... G01S 19/34 |
| | | 342/357.62 |
| 9,322,924 B2* | 4/2016 | Abraham ................. G01S 19/34 |
| 9,696,429 B2* | 7/2017 | Turon ...................... G01S 19/34 |
| 9,756,172 B2* | 9/2017 | Piemonte .............. H04W 16/22 |
| 2001/0029530 A1 | 10/2001 | Yoshiko et al. .............. 709/223 |

(Continued)

FOREIGN PATENT DOCUMENTS

JP          2014-146876          8/2014

*Primary Examiner* — John J Lee
(74) *Attorney, Agent, or Firm* — Fitzpatrick, Cella, Harper & Scinto

(57) ABSTRACT

A communication apparatus includes a memory that stores instructions, and a processor that executes the instructions. The instructions are executed to transmit to another communication apparatus a notification for requesting a predetermined type of packet which is used by the communication apparatus for changing an operation mode of the communication apparatus from a first operation mode to a second operation mode higher than the first operation mode in power consumption, and to determine, in a case where the predetermined type of packet is received from the another communication apparatus during a test time period according to the notification, the first operation mode as an operation mode of the communication apparatus after the test time period. The operation mode of the communication apparatus is set to the first operation mode according to such a determination.

14 Claims, 19 Drawing Sheets

(56) References Cited

U.S. PATENT DOCUMENTS

| | | | |
|---|---|---|---|
| 2009/0058719 A1* | 3/2009 | Huang | G01S 19/34 342/357.57 |
| 2009/0322870 A1* | 12/2009 | Fujiki | G02B 21/367 348/79 |
| 2010/0111109 A1* | 5/2010 | Herzog | H04N 21/6131 370/474 |
| 2012/0069787 A1* | 3/2012 | Tamura | H04L 12/2838 370/315 |
| 2013/0229688 A1* | 9/2013 | Kumagai | G06K 15/402 358/1.15 |
| 2013/0232257 A1* | 9/2013 | Mukai | H04L 43/10 709/224 |

\* cited by examiner

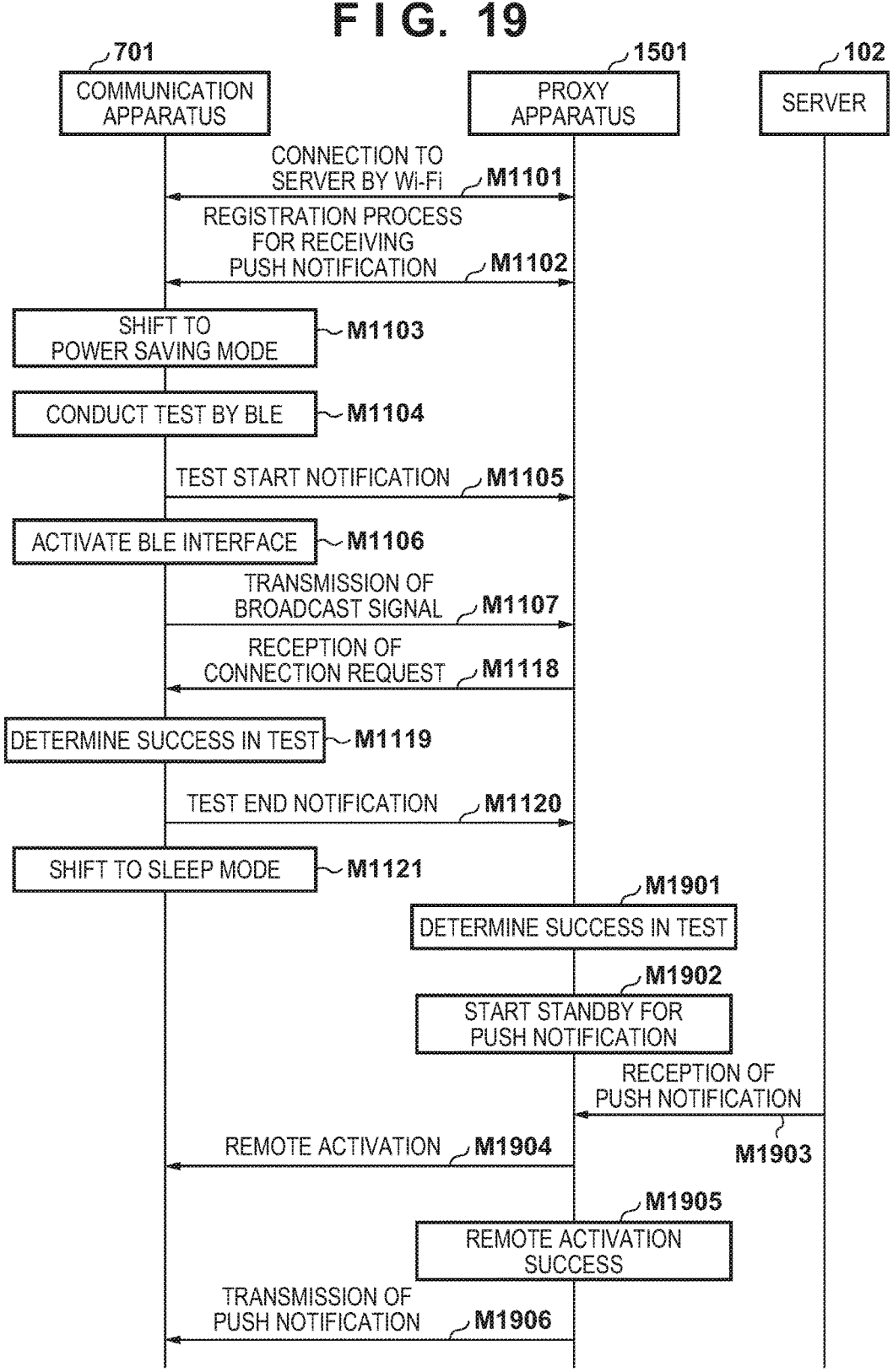

COMMUNICATION APPARATUS, METHOD OF CONTROLLING THE SAME, AND NON-TRANSITORY COMPUTER-READABLE STORAGE MEDIUM

BACKGROUND OF THE INVENTION

Field of the Invention

The present invention relates to a communication apparatus, a method of controlling the same, and a non-transitory computer-readable storage medium.

Description of the Related Art

Conventionally, if a communication apparatus maintains continuous connection to a communication partner in order to perform communication of high immediacy, power consumption may be increased, and an operating time of a device may be decreased. It is therefore necessary to save power for communication processing when communication of high immediacy is performed.

As a technique capable of saving the power for the communication processing when communication of high immediacy is performed, a technique of establishing connection when a communication apparatus receives a trigger from a server is proposed in Japanese Patent Laid-Open No. 2014-146876. According to this technique, power savings can be achieved without requiring the communication apparatus to maintain continuous connection. There is also a technique such as BLE (Bluetooth® Low Energy) as a power saving technique or a WoL (Wake on LAN) as a technique of activating the communication apparatus from a sleep mode. Note that the sleep mode refers to a mode in which some functions of the communication apparatus are turned off, and power consumption is suppressed.

When the communication apparatus in the sleep mode is caused to receive a message (for example, a push notification) by activating it from a remote site, activation from the remote site cannot be performed in some cases. For example, since connection is cut off due to distance limitation in BLE, the communication apparatus shifted to the sleep mode cannot return from the sleep mode.

SUMMARY OF THE INVENTION

The present invention has been made in consideration of the above-described problems, and provides a communication apparatus, a method of controlling the same, and a non-transitory computer-readable storage medium for increasing a possibility that a communication apparatus in a low power consumption mode can recover from a remote site.

According to one aspect of the present invention, there is provided a communication apparatus which comprises: a mode control unit configured to switch between a first operation mode and a second operation mode lower than the first operation mode in power consumption, each of which is an operation mode of the communication apparatus; and a determination unit configured to determine whether it is possible to switch the operation mode of the communication apparatus from the second operation mode to the first operation mode in response to receiving a predetermined packet from another communication apparatus, wherein if the determination unit determines that it is possible to switch from the second operation mode to the first operation mode in response to receiving the predetermined packet, the mode control unit switches the operation mode of the communication apparatus from the first operation mode to the second operation mode.

Further features of the present invention will become apparent from the following description of exemplary embodiments (with reference to the attached drawings).

BRIEF DESCRIPTION OF THE DRAWINGS

FIG. 19 is a chart showing an example of a sequence when an activation test succeeds according to the third embodiment.

DESCRIPTION OF THE EMBODIMENTS

The present invention will be described, based on its embodiments, in detail below with reference to the accompanying drawings. Note that each arrangement shown in the embodiments below is merely an example, and the present invention is not limited to the arrangement shown.

First Embodiment (System Arrangement)

Figure 1:
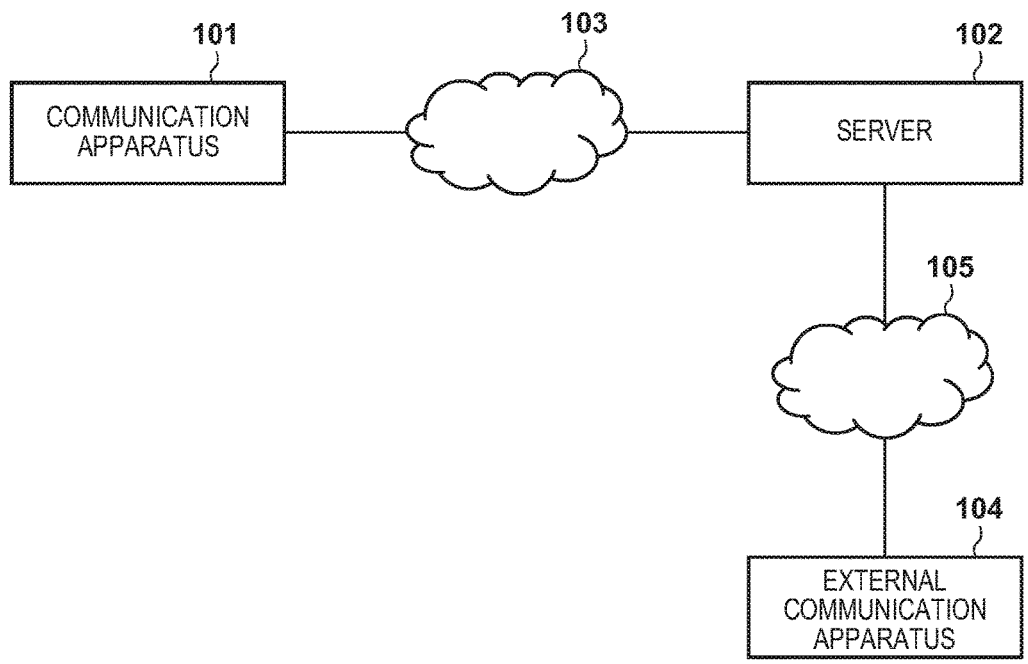
FIG. 1 is a schematic view showing a system arrangement according to the first embodiment.

FIG. 1 is a schematic view showing a system arrangement according to the first embodiment. A communication apparatus 101 can receive a push notification (message). Note that the push notification in this embodiment is transmitted without accepting a request from specific data. The communication apparatus 101 is a device such as a digital camera, a projector, a monitoring camera, a digital video camera, an MFP, or a printer and communicates with a server 102 via a network 103. Note that the MFP stands for Multi Function Printer. The communication apparatus 101 may be an apparatus such as a smartphone, a tablet, or a PC, or may be an application or a Web browser operating on these apparatuses. The communication apparatus 101 may be implemented by a combination of a plurality of apparatuses and a server, service, or the like. The communication apparatus 101 may have a function of detecting a temperature, a humidity, position information, an illuminance, a human, or the like.

The server 102 is a server apparatus capable of transmitting the push notification (message). In this embodiment, the server is implemented by one PC. However, servers may be arranged on a cloud in a distributed manner. The server 102 is a device such as a digital camera, a projector, a monitoring camera, a digital video camera, an MFP, or a printer and communicates with the communication apparatus 101 via the network 103 by a wireless LAN (Local Area Network), a wired LAN, or another wireless or wired method. The server 102 may be an apparatus such as a smartphone, a tablet, or a PC, or may be an application or a Web browser operating on these apparatuses. The server 102 may be implemented by a combination of a plurality of apparatuses and a server, service, or the like. The server 102 may have a function of detecting a temperature, a humidity, position information, an illuminance, a human, or the like.

An external communication apparatus 104 is a communication apparatus which requires the server 102 to transmit the push notification. The external communication apparatus 104 may be an application server which provides Social Networking Service (SNS), cloud service, or the like. The external communication apparatus 104 is a device such as a digital camera, a projector, a monitoring camera, a digital video camera, an MFP, or a printer and communicates with the server 102 via a network 105. The external communication apparatus 104 may be an apparatus such as a smartphone, a tablet, or a PC, or may be an application or a Web browser operating on these apparatuses. The external communication apparatus 104 may be implemented by a combination of a plurality of apparatuses and a server, service, or the like. The external communication apparatus 104 may have a function of detecting a temperature, a humidity, position information, an illuminance, a human, or the like. In this embodiment, the server 102 and the external communication apparatus 104 are independent of each other. However, both of them may be integrated into one apparatus.

The network 103 connects the communication apparatus 101 and the server 102. The network 103 in this embodiment can also be implemented by a network such as the Internet, a WAN (Wide Area Network), or the LAN, or a combination of these. The network 103 can further be implemented by a combination of, for example, a wireless LAN, wireless ad hoc network, wired LAN, BLE, ZigBee®, UWB (Ultra Wide Band), Wi-Fi Aware®, 3GPP, LTE (Long Term Evolution), public wireless, USB (Universal Serial Bus), NFC (Near Field Communication), or optical communication and the other wired and wireless methods. Like the network 103, the network 105 can be implemented in various forms.

(Hardware Arrangement)

Figure 2:
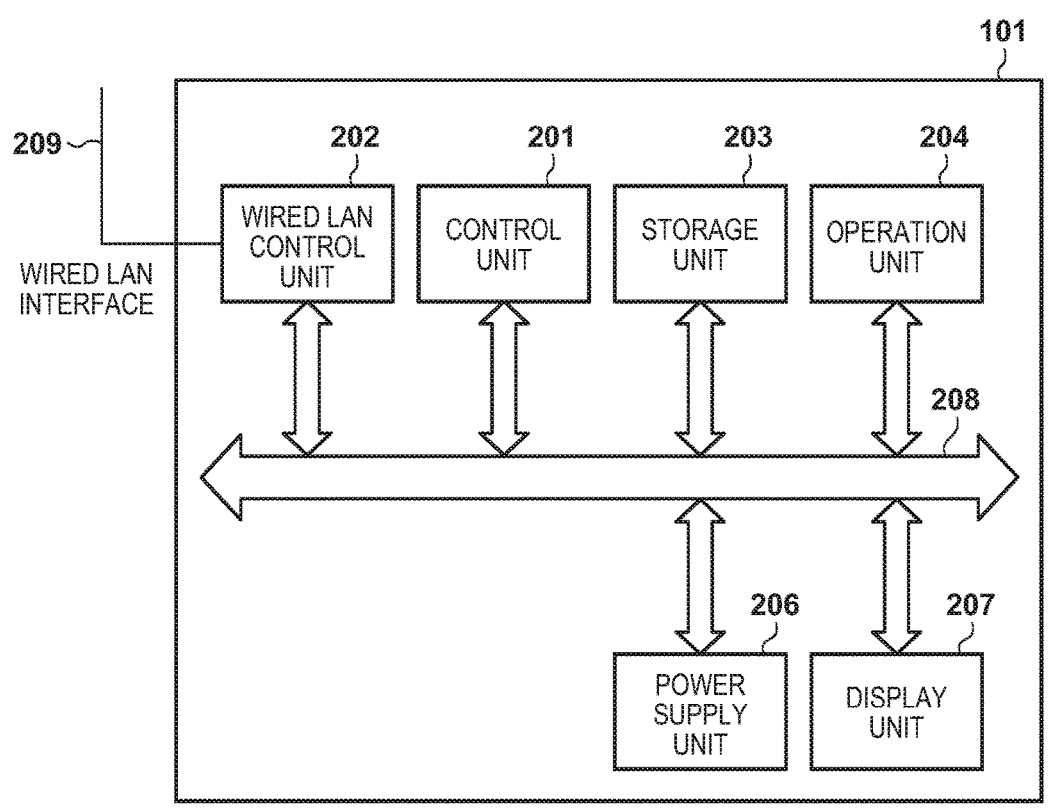
FIG. 2 is a block diagram showing an example of the hardware arrangement of a communication apparatus 101.

FIG. 2 is a block diagram showing an example of the hardware arrangement of the communication apparatus 101. The communication apparatus 101 includes a control unit 201, a wired LAN control unit 202, a storage unit 203, an operation unit 204, a power supply unit 206, a display unit 207, a system bus 208, and a wired LAN interface 209.

The control unit 201 generally controls an operation in the communication apparatus 101. More specifically, the control unit 201 controls the wired LAN control unit 202, the storage unit 203, the operation unit 204, the power supply unit 206, and the display unit 207. The wired LAN control unit 202 controls communication performed via the wired LAN interface 209. The wired LAN control unit 202 may be an external device equipped by a USB or the like. The storage unit 203 stores and manages various data such as network information and server information. The operation unit 204 accepts an operation from a user. The operation unit 204 includes, for example, a keyboard, a button, a touch display, and a voice detection device. The user can perform the operation through them.

The power supply unit 206 supplies power to the control unit 201, the wired LAN control unit 202, the storage unit 203, the operation unit 204, and the display unit 207. The power supply unit 206 can supply power to only a specific arrangement. The power supply unit 206 may perform, for example, a process of supplying the power to only the wired LAN control unit 202 and not supplying the power to other components. In this embodiment, the power supply unit 206 only performs ON/OFF of power supply. However, the present invention is not limited to this. The power supply unit 206 may adjust the clock of a CPU (Central Processing Unit) or control an execution mode of a module or hardware such as turn-off of a wireless chip.

The display unit 207 performs various display operations by using a liquid crystal panel, an LED, or the like. The display unit 207 displays, for example, a GUI (Graphical User Interface) for the user to operate the communication apparatus 101. The display unit 207 also displays, for example, the push notification received from the server 102, an error message, an option for activation methods of the communication apparatus 101, and various other messages. In this embodiment, the display unit 207 displays the GUI. However, the display unit 207 can also perform output using a method of, for example, flashing of the LED, an image, a sound, a vibration, or a message.

In this embodiment, the communication apparatus 101 includes the wired LAN control unit 202, and communicates with the server 102 by the wired LAN. However, the communication method is not limited to this. For example, when the communication apparatus 101 performs communication by the other wired and wireless methods such as the wireless LAN, NFC, or public wireless, it may include a control unit and an interface required for the communication.

(Functional Arrangement)

Figure 3:
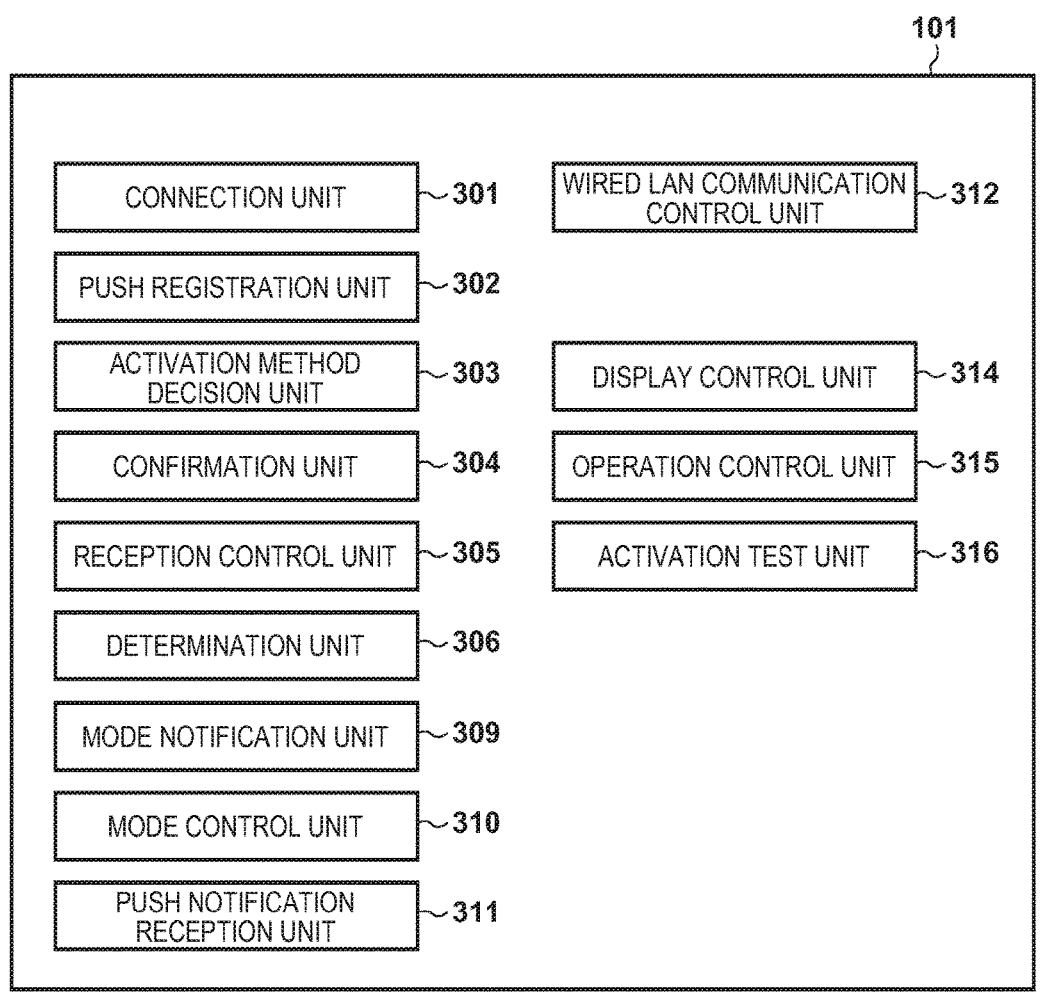
FIG. 3 is a block diagram showing an example of the functional arrangement of the communication apparatus 101.

FIG. 3 is a block diagram showing an example of the functional arrangement of the communication apparatus 101. In this embodiment, the function of each functional block shown below is executed as a software program. However, some or all of these functional blocks may be arranged by hardware.

A connection unit 301 is connected to the server 102. In this embodiment, the communication apparatus 101 and the server 102 are connected to each other by protocols which use a TCP (Transmission Control Protocol) and a UDP (User Datagram Protocol). Note that a connection method is not limited to these, and the communication apparatus 101 and the server 102 may be connected to each other by another protocol.

A push registration unit 302 performs a registration process for accepting the push notification from the server 102. The push registration unit 302 performs registration by using a protocol such as a HTTP (Hyper Text Transfer Protocol), HTTP/2, QUIC (Quick UDP Internet Connections), or XMPP (Extensible Messaging and Presence Protocol). Note that a protocol used by the push registration unit 302 is not limited to these.

The push registration unit 302 is connected to the server 102 by the HTTP/2 and registers an identifier capable of identifying the communication apparatus 101 uniquely. It is only necessary for the identifier used here to specify the communication apparatus 101 uniquely. The format of information registered here may be an XML or JSON. Note that the XML stands for Extensible Markup Language, and the JSON stands for JavaScript Object Notation. The identifier may be an IP (Internet Protocol) address of the communication apparatus 101, UUID unique to a device, physical address of BLE, Cookie, MAC address, or value (for example, a hash value) generated by utilizing some of them. Note that the UUID stands for Universally Unique Identifier. The identifier may also be a combination of a plurality of these.

An activation method decision unit 303 decides an activation method used for an activation test to determine whether it is possible to activate the communication apparatus 101. In this embodiment, the activation method decision unit 303 decides a WoL (Wake on LAN) as the activation method. However, the activation method decision unit 303 can also decide another method as the activation method. The activation method decision unit 303 may also decide, based on an input from the user, the activation method used for the activation test.

A confirmation unit 304 confirms whether the server 102 complies with the activation method decided to be used for the activation test by the activation method decision unit 303. The confirmation unit 304 may confirm the activation method complied with the server 102 by inquiring of the server 102 or another communication apparatus. The confirmation unit 304 performs the confirmation by using the protocol such as the HTTP, HTTP/2, QUIC, or XMPP. However, the present invention is not limited to these. The confirmation unit 304 may perform the conformation by using another protocol. The confirmation unit 304 may be connected to the server 102 by the method such as the NFC or BLE and perform the confirmation. The confirmation unit 304 may store a confirmed result in the storage unit 203. If the confirmation unit 304 has confirmed whether the server 102 complies with the activation method once in the past, it may perform the confirmation by utilizing the past result with reference to the storage unit 203. The confirmation unit 304 may save the activation method complied with the server 102 in the storage unit 203 in advance.

An activation test unit 316 notifies the server 102 of the start of the activation test. The activation test unit 316 notifies the server 102 of the activation method used for the activation test, parameters regarding the activation test, and a parameter linked with the activation method used for the activation test. For example, when the WoL is used as the activation method, the MAC address or the like of the communication apparatus 101 is considered as the parameter linked with the activation method. Start time and end time of the activation test, timeout time for determining whether the activation test fails, a transmission count of activation packets, a transmission timing of each activation packet, and the like are considered as the parameters regarding the activation test. Note that all the above-described parameters need not always be notified. Each activation packet in this embodiment is a packet for returning the communication apparatus from the sleep mode (an operation mode in which some functions are suspended) to a non-sleep mode, a detail of which will be described later.

The communication apparatus 101 may set the timeout time, or obtain it from the server 102 or the other communication apparatus. The communication apparatus 101 may also obtain the timeout time through calculation performed by acquiring network information such as an RTT (Round Trip Time) and a packet loss rate, and using them singly or in combination. The timeout time may be a time in which the communication apparatus 101 transits from the non-sleep mode to the sleep mode. In this case, if the activation test does not succeed before the time by which the communication apparatus 101 transits to the sleep mode (that is the timeout time) has elapsed, the communication apparatus 101 does not transit to the sleep mode.

The transmission count of the activation packets is the number of times the server 102 transmits the activation packets. The server 102 transmits the activation packets to the communication apparatus 101 by the notified transmission count. The communication apparatus 101 can determine, by notifying the server 102 of the transmission count of the activation packets, whether the activation packets do not reach the communication apparatus 101 because of an accidental factor such as a packet loss or the packets do not reach because they are dropped by an intermediate equipment such as a router in the network.

The activation test unit 316 notifies the server 102 of the end of the activation test. The activation test unit 316 may notify whether it succeeds in activation or may include, in the notification, a time taken to succeed in the activation test. Without being limited to these kinds of information, the activation test unit 316 may also notify other information. The activation test unit 316 uses the protocol such as the HTTP, HTTP/2, QUIC, or XMPP when notifying the server 102 of the start and end of the activation test. However, the present invention is not limited to these. The activation test unit 316 may use another protocol.

A reception control unit 305 controls reception of a signal from the server 102. If the activation test unit 316 conducts the activation test by the WoL, the reception control unit 305 controls the reception through a wired LAN communication control unit 312.

A determination unit 306 determines whether the signal received by the reception control unit 305 from the server 102 is the activation packet. If the signal received by the reception control unit 305 from the server 102 is the activation packet, the determination unit 306 determines that the activation test succeeds. If the reception control unit 305 cannot receive the activation packet from the server 102, the determination unit 306 determines that the activation test fails. For example, the determination unit 306 determines that the activation test fails if the reception control unit 305 cannot receive the activation packet from the server 102 during a predetermined timeout time set by the activation test unit 316. The determination unit 306 also determines whether a signal received by the reception control unit 305 is an activation signal when the communication apparatus 101 is in the sleep mode.

A mode control unit 310 performs, via the power supply unit 206, control for switching the communication apparatus 101 between the sleep mode and the non-sleep mode. The sleep mode refers to a power saving mode in which at least some functions of the communication apparatus 101 are suspended. The sleep mode represents a mode in which, for example, the power supply unit 206 continues to supply the power to the wired LAN control unit 202 and stops supplying the power to the other components. In this embodiment, a description will be mainly made on an example in which the mode control unit 310 implements the sleep mode by suspending some functions. However, the present invention is not limited to this. The mode control unit 310 may implement the sleep mode by, for example, adjusting the clock of the CPU included in the communication apparatus 101, or controlling the execution mode of the module or hardware such as turn-off of the wireless chip. The mode control unit 310 may perform control so as not to utilize some of a plurality of CPUs or so as to discard information other than specific data. That is, the communication apparatus 101 of this embodiment can operate in a plurality of operation modes including the first operation mode and the second operation mode (sleep mode) lower than the first operation mode in power consumption. A plurality of stages may be provided for the sleep mode depending on the amount of power consumption. In this embodiment, the mode control unit 310 controls power supply of the hardware. However, the present invention is not limited to this. Power savings may be achieved by performing control so as not to use some functions of the software. The mode control unit 310 may switch the communication apparatus 101 to the sleep mode when carrying out the activation test. At this time, the mode control unit 310 may switch the communication apparatus 101 to the non-sleep mode if failure in the activation test is determined.

A push notification reception unit 311 receives the push notification. The push notification reception unit 311 receives the push notification by using a protocol such as the HTTP/2, WebSocket, QUIC, or XMPP. However, the present invention is not limited to these. The push notification reception unit 311 may use another protocol. The push notification reception unit 311 establishes connection of the HTTP/2 with the server 102 when using the HTTP/2. The push registration unit 302 transmits a stream reservation request (PUSH_PROMISE frame) for receiving the push notification on the connection. When transmitting the push notification, the server 102 utilizes a stream reserved by the reservation request to transmit the push notification. Note that the stream reservation request may be received from the server 102.

The wired LAN communication control unit 312 controls wired LAN communication via the wired LAN control unit 202. A display control unit 314 controls the display unit 207 to perform various display control operations on, for example, the received push notification and error message. In this embodiment, a display means is utilized in order to notify the user and the application of the push notification and the error message. However, the present invention is not limited to this. The method of, for example, flashing of the LED, an image, a sound, or a vibration may be utilized. An operation control unit 315 performs a process based on the operation performed by the user performs on the operation unit 204.

(Flowchart)

Figure 4:
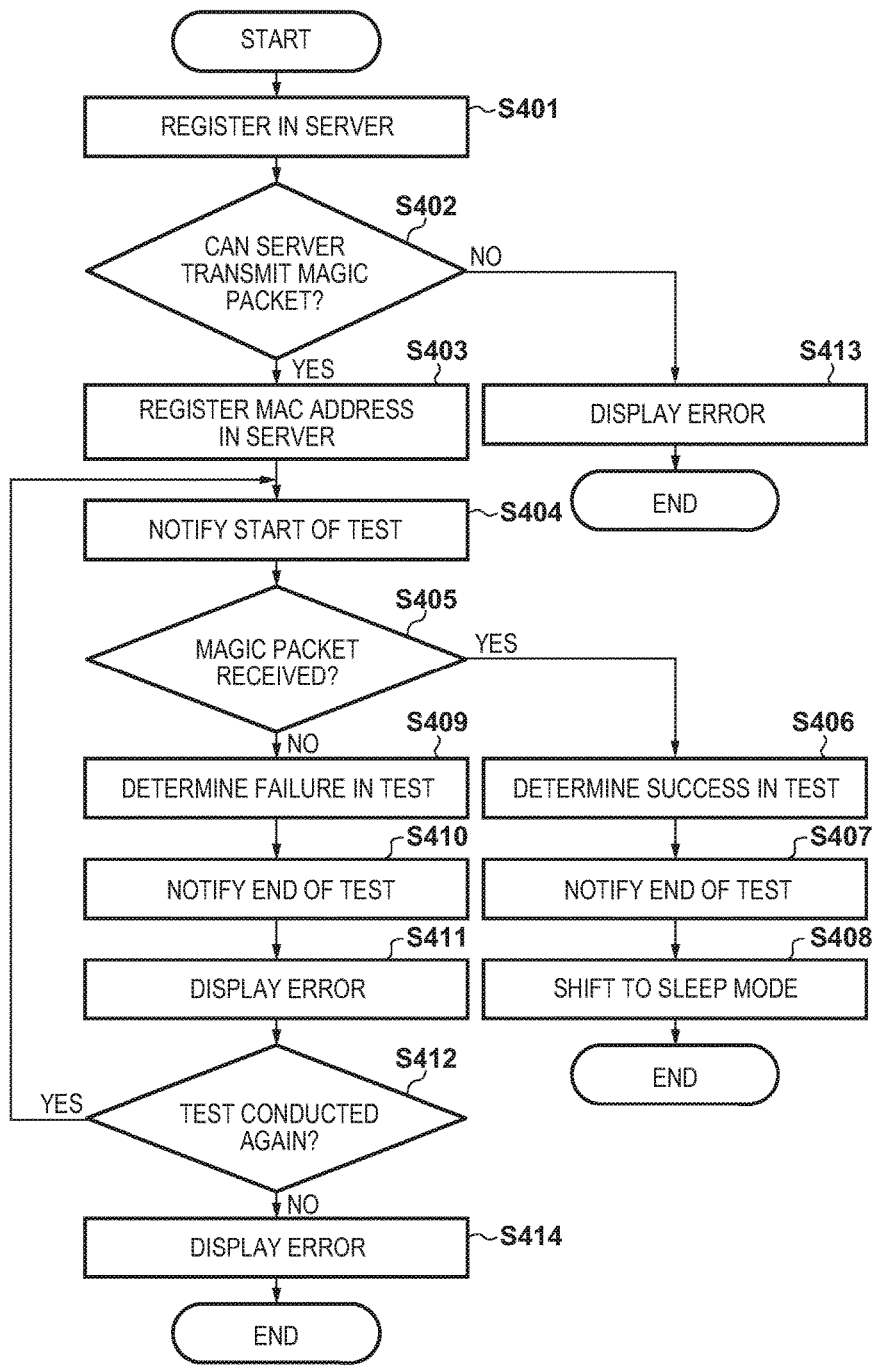
FIG. 4 shows an example of a flowchart of the communication apparatus 101.

The operation of the communication apparatus 101 will now be described in detail with reference to FIG. 4. FIG. 4 shows an example of a flowchart of the communication apparatus 101 according to this embodiment. Note that the flowchart will be described with reference to FIGS. 13A to 13F as well. FIGS. 13A to 13F are views each showing an example of a screen on the display unit 207 obtained by the display control unit 314. The push registration unit 302 is connected to the server 102 via the connection unit 301 (step S401). The push registration unit 302 registers information needed to receive the push notification from the server 102. As an example, the push registration unit 302 registers information such as the IP address of the communication apparatus 101 or the UUID of the communication apparatus 101.

For the process in step S401, the communication apparatus 101 may search for the server 102 by using a search protocol such as SSDP, mDNS, or WS-Discovery, or may dynamically obtain information needed for connection to the server 102 by using a dynamic DNS or the like. The communication apparatus 101 may also obtain the URL (Uniform Resource Locator) or IP address of the server 102, or other information needed for connection to the server 102 from the external communication apparatus 104 or the other communication apparatus.

When the communication apparatus 101 is the Web browser, it may obtain a web page from the server 102, the external communication apparatus 104, or the other communication apparatus and specify the server 102 based on a description on the obtained web page. As an element which constitutes the web page, there is an HTML (Hyper Text Markup Language) file, Javascript file, CSS (Cascading Style Sheets) file, or the like. However, the present invention is not limited to these. The communication apparatus 101 may obtain the URL, IP address, or the other information needed for connection to the server 102 held in the storage unit 203. The communication apparatus 101 may decide the server 102 based on an input from the user. There is, for example, the URL or IP address of the server 102, or the like. However, the present invention is not limited to these. The communication apparatus 101 may display, on the display unit 207, a candidate for a connection destination as the server 102 and decide the server 102 based on the input from the user.

The activation method decision unit 303 decides the activation method used to conduct a remote activation test. In this embodiment, the WoL (Wake on LAN) is used as the activation method. In the WoL, the server 102 transmits an activation packet called a magic packet. The magic packet here includes, somewhere in a payload, a data pattern obtained by repeating the MAC address of an apparatus which wants to be activated following FF:FF:FF:FF:FF:FF: sixteen times. It is determined that the communication apparatus 101 is activated remotely from the server 102 when receiving the magic packet from the server 102.

The magic packet used in the WoL may be discarded by a router, firewall, or another intermediate equipment between the communication apparatus 101 and the server 102. In this case, remote activation for the communication apparatus 101 cannot be performed. In this embodiment, the communication apparatus 101 can increase the possibility of success in remote activation by confirming that the magic packet can be received in the activation test.

In this embodiment, the WoL is described as an example. However, the present invention is not limited to this. Even with the TCP, UDP, or another protocol, the communication apparatus 101 can be activated from a remote site by causing the server 102 to transmit special data to the communication apparatus 101. In this case, it is possible to decrease an intervention frequency in activation of a host CPU by providing a filter which receives only the special data in a reception unit of the communication apparatus 101, achieving further power savings.

When using the TCP, the communication apparatus 101 registers, in the server 102, the IP address of the communication apparatus 101 and a port number which stands by in order to stand by for TCP connection. The server 102 performs TCP connection on the IP address and the port number registered by the communication apparatus 101. It is possible to determine that the communication apparatus 101 is activated remotely if it receives, from the server 102, a packet with a set SYN flag which indicates TCP connection. The communication apparatus 101 determines that the activation test fails if it cannot receive the packet with the set SYN flag which indicates TCP connection. The wired LAN control unit 202 processes only a packet with a set SYN flag addressed to a particular port transmitted from the server 102. As a result, it is possible to decrease the intervention frequency in activation of the host CPU, achieving further power savings.

Figure 13A:
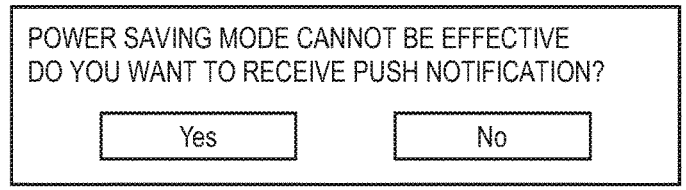
FIGS. 13A to 13F are views each showing an example of a screen on a display unit 207.

After the process in step S401, the confirmation unit 304 confirms whether the server 102 can comply with the WoL. That is, the confirmation unit 304 confirms whether the server 102 can transmit the magic packet of the WoL (step S402). If the confirmation unit 304 confirms that the server 102 cannot transmit the magic packet (No in step S402), the display control unit 314 displays an error on the display unit 207 (step S413). FIG. 13A shows the example of the screen showing the error displayed in step S413. Note that if the user selects Yes, the push notification reception unit 311 stands by in order to receive the push notification without causing the mode control unit 310 to shift the communication apparatus 101 to the power saving mode, that is, in the non-sleep mode. If the user selects No, the push notification reception unit 311 terminates standby for receiving the push notification. In this embodiment, the communication apparatus 101 utilizes the display means in order to notify the user or the application of the error. However, the present invention is not limited to this. The communication apparatus 101 may notify the error by utilizing flashing of the LED, an image, a sound, a vibration, a message, or the like.

If the confirmation unit 304 confirms that the server can transmit the magic packet (Yes in step S402), the activation test unit 316 registers the MAC address of the communication apparatus 101 in the server 102 (step S403). The activation test unit 316 notifies the server 102 of the start of a test (step S404). The reception control unit 305 starts to stand by for the magic packet through the wired LAN communication control unit 312. Note that the reception control unit 305 may start to stand by for the magic packet after the mode control unit 310 sets the communication apparatus 101 in the sleep mode.

The determination unit 306 determines whether the packet received by the reception control unit 305 is the magic packet for the communication apparatus 101 (step S405). If the determination unit 306 determines that the received packet is the magic packet for the communication apparatus 101 (Yes in step S405), it determines that the activation test succeeds (step S406). Then, the activation test unit 316 notifies the server 102 of the end of the activation test (step S407). The mode control unit 310 shifts the communication apparatus 101 to the sleep mode (step S408).

Figure 13B:
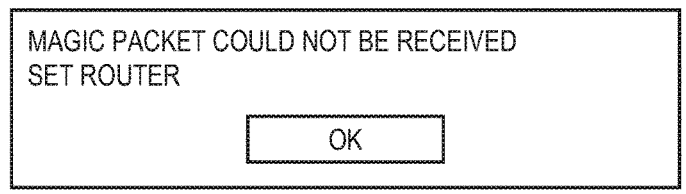

If the determination unit 306 determines that the received packet is not the magic packet or the packet cannot be received (No in step S405), it determines that the activation test fails (step S409). The mode control unit 310 performs control so as to set the communication apparatus 101 in the non-sleep mode when the activation test is conducted by setting the communication apparatus 101 in the sleep mode. The activation test unit 316 notifies the server 102 of the end of the activation test (step S410). The display control unit 314 displays an error on the display unit 207. FIG. 13B shows an example of a screen showing the error displayed in step S411. Note that if the user selects OK, the router between the communication apparatus 101 and the server 102 is set. For example, the user sets the router so as to transmit the magic packet without discarding it.

Figure 13C:
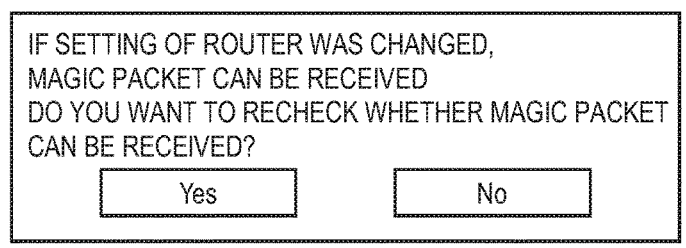

Then, the activation test unit 316 determines whether to conduct the activation test again (step S412). The activation test unit 316 may determine, based on an input from the user, whether to conduct the activation test again. At this time, the display control unit 314 may perform display, on the display unit 207, for checking with the user for whether to conduct the activation test again. FIG. 13C shows an example of a screen showing the display performed in step S412. Note that if the user selects Yes, the activation test is conducted again (Yes in step S412). If the user selects No, the activation test is not conducted (No in step S412). If the activation test is not conducted, the display control unit 314 displays an error on the display unit 207 (step S414). FIG. 13A shows the example of the screen showing the error displayed in step S414. If the user selects Yes, the push notification reception unit 311 stands by in order to receive the push notification without causing the mode control unit 310 to shift the communication apparatus 101 to the power saving mode, that is, in the non-sleep mode.

(Sequence Between Communication Apparatus 101 and Server 102)

Figure 5:
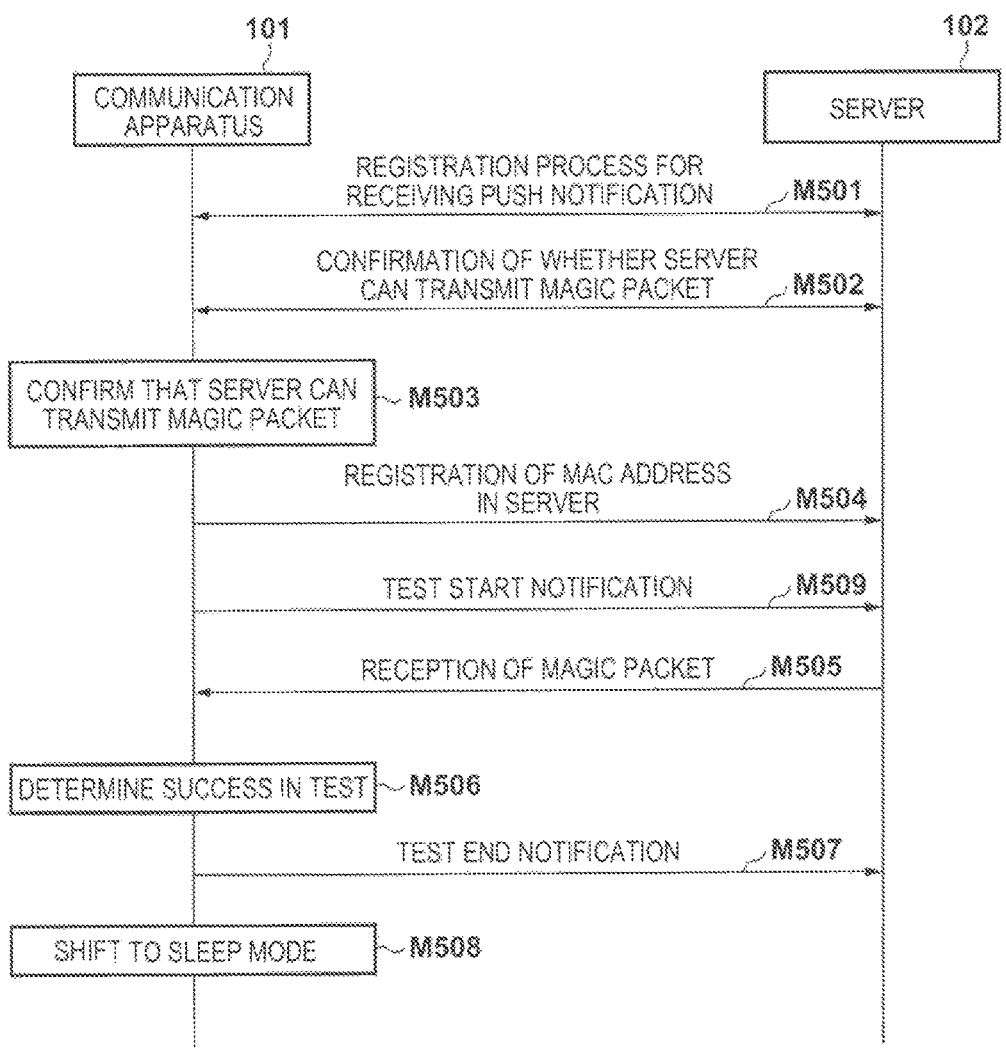
FIG. 5 is a chart showing an example of a sequence when an activation test succeeds according to the first embodiment.

Sequences between the communication apparatus 101 and the server 102 when the activation test succeeds/fails will now be described with reference to FIGS. 5 and 6. FIG. 5 is a chart showing an example of the sequence when the activation test succeeds. The process from M501 to M502 corresponds to the process from step S401 to step S402. M503 is the process performed when it is determined Yes in step S402. M504 corresponds to the process in step S403. M509 corresponds to the process in step S404. M505 is the process performed when the magic packet is received in step S405. M506 corresponds to the process in step S406. M507 corresponds to the process in step S407. M508 corresponds to the process in step S408.

Figure 6:
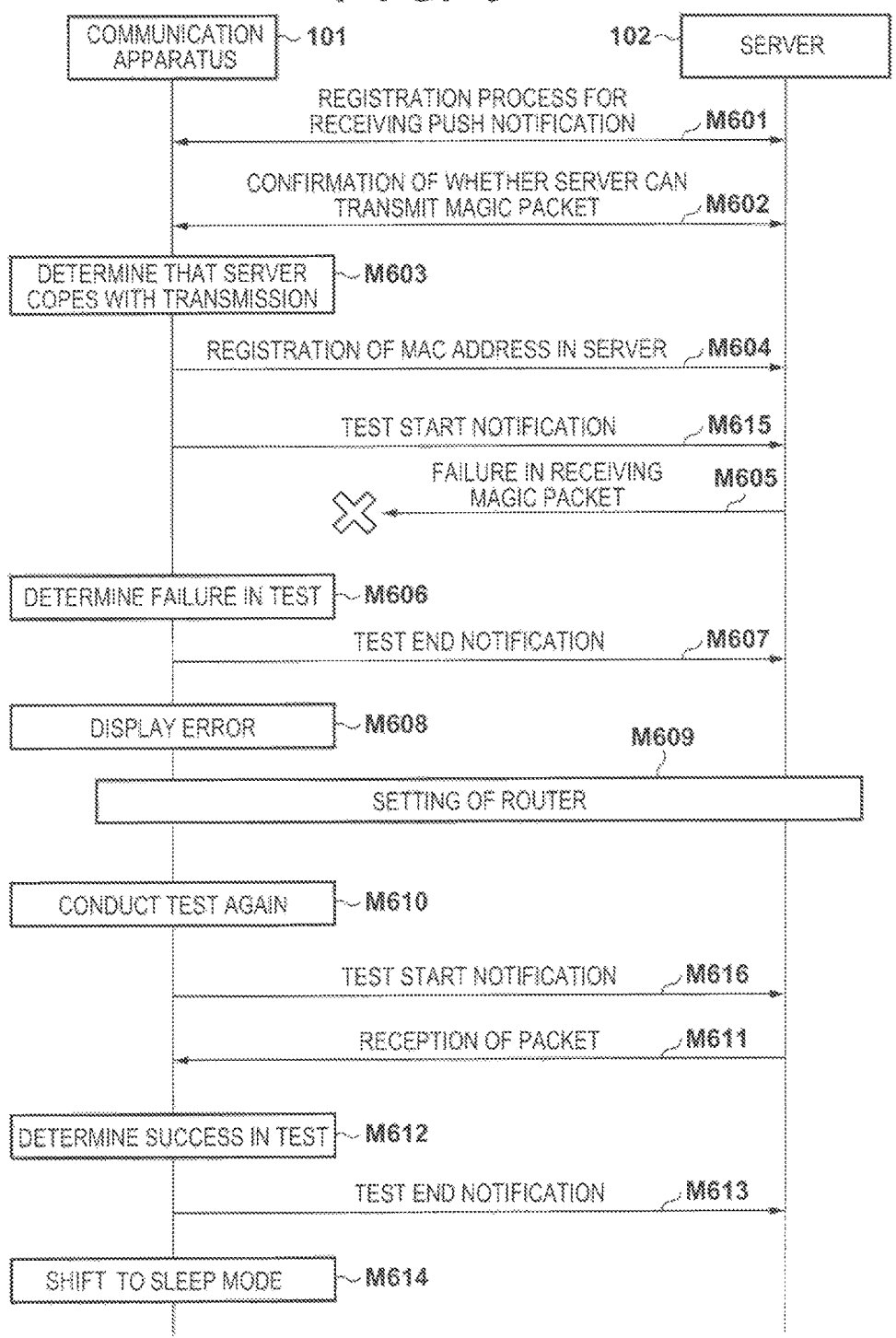
FIG. 6 is a chart showing an example of a sequence when the activation test fails according to the first embodiment.

FIG. 6 is the chart showing an example of the sequence when the activation test fails. The process from M601 to M604 is the same as that from M501 to M504. The process in M615 is the same as that in M509. The magic packet transmitted by the server 102 in M605 is discarded by the router between the communication apparatus 101 and the server 102. In M606, the determination unit 306 determines that the activation test fails (step S409) because the magic packet cannot be received. The process in M607 is the same as that in M507. In M608, the display control unit 314 displays, on the display unit 207, the error as shown in FIG. 13B. In M609, the user sets the router so as to transmit the magic packet without discarding it.

In M610, the display control unit 314 performs, on the display unit 207, the display as shown in FIG. 13C. Assuming that the user selects Yes, the activation test is conducted again. The process in M616 is the same as that in M615. The process in M612 is the same as that in M506. The process in M613 is the same as that in M507. The process in M614 is the same as that in M508.

As described above, in this embodiment, if the activation packet transmitted from the server 102 by the intermediate equipment such as the router cannot reach the communication apparatus 101, the user is prompted to cope with it appropriately, or the communication apparatus 101 is set in the non-sleep mode. This can solve a problem that remote activation cannot be performed.

In this embodiment, the description has been made by using the wired LAN. However, the present invention is not limited to this. The present invention can also be implemented by the combination of, for example, the wireless LAN, wireless ad hoc network, BLE, ZigBee®, UWB (Ultra Wide Band), Wi-Fi Aware®, 3GPP, LTE (Long Term Evolution), public wireless, USB, NFC (Near Field Communication), or optical communication and the other wired and wireless methods.

Second Embodiment (System Arrangement)

Figure 7:
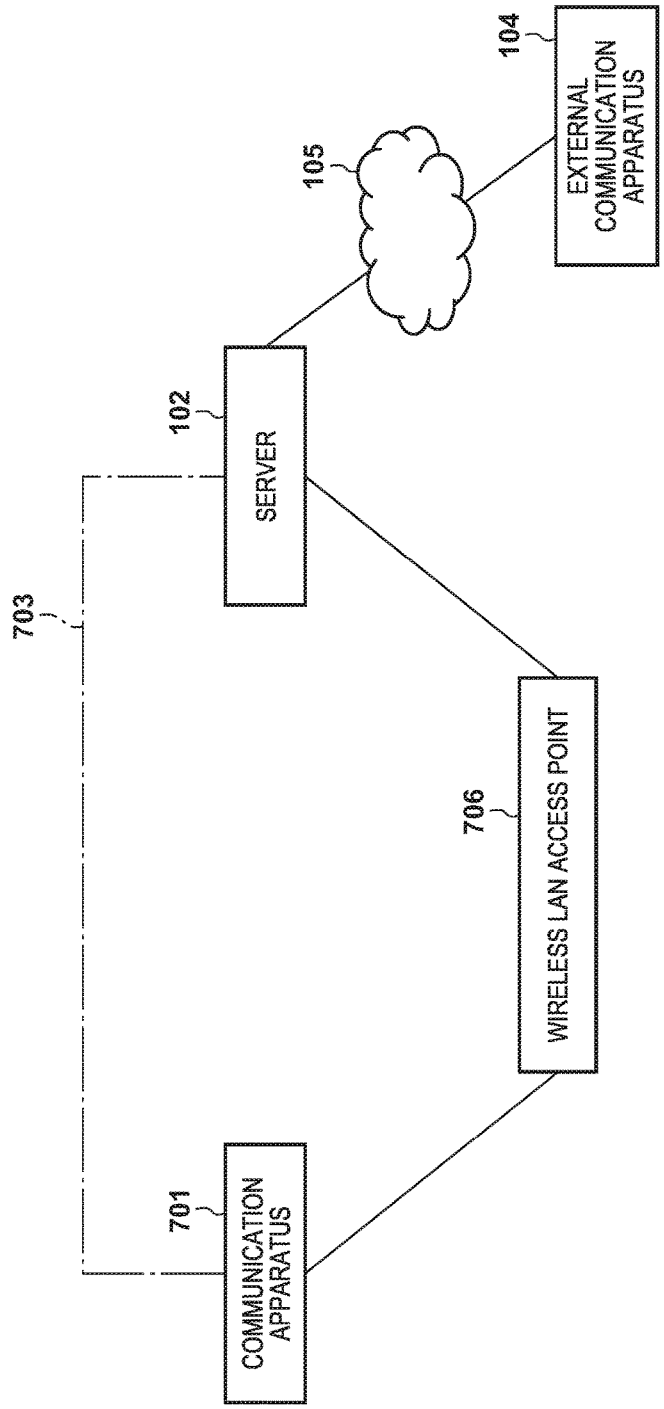
FIG. 7 is a schematic view showing a system arrangement according to the second embodiment.

FIG. 7 is a schematic view showing a system arrangement according to the second embodiment. A difference from FIG. 1 described in the first embodiment will be described below. A communication apparatus 701 receives a push notification. The communication apparatus 701 is a device such as a digital camera, a projector, a monitoring camera, a digital video camera, an MFP, or a printer and communicates with a server 102 via a wireless LAN access point 706. In this embodiment, the communication apparatus 701 performs communication via the wireless LAN access point 706. However, the communication apparatus 701 may be connected to the server 102 directly. The communication apparatus 701 may be an apparatus such as a smartphone, a tablet, or a PC, or may be an application or a Web browser operating on these apparatuses. The communication apparatus 701 may be implemented by a combination of a plurality of apparatuses and a server, service, or the like. The communication apparatus 701 may have a function of detecting a temperature, a humidity, position information, an illuminance, a human, or the like.

The communication apparatus 701 utilizes BLE connection 703 to communicate with the server 102 in BLE communication. In this embodiment, the communication apparatus 701 and the server 102 can perform communication via BLE. However, the present invention is not limited to this. They may perform communication by ZigBee®, NFC, Wi-Fi Aware®, or the like.

(Hardware Arrangement)

Figure 8:
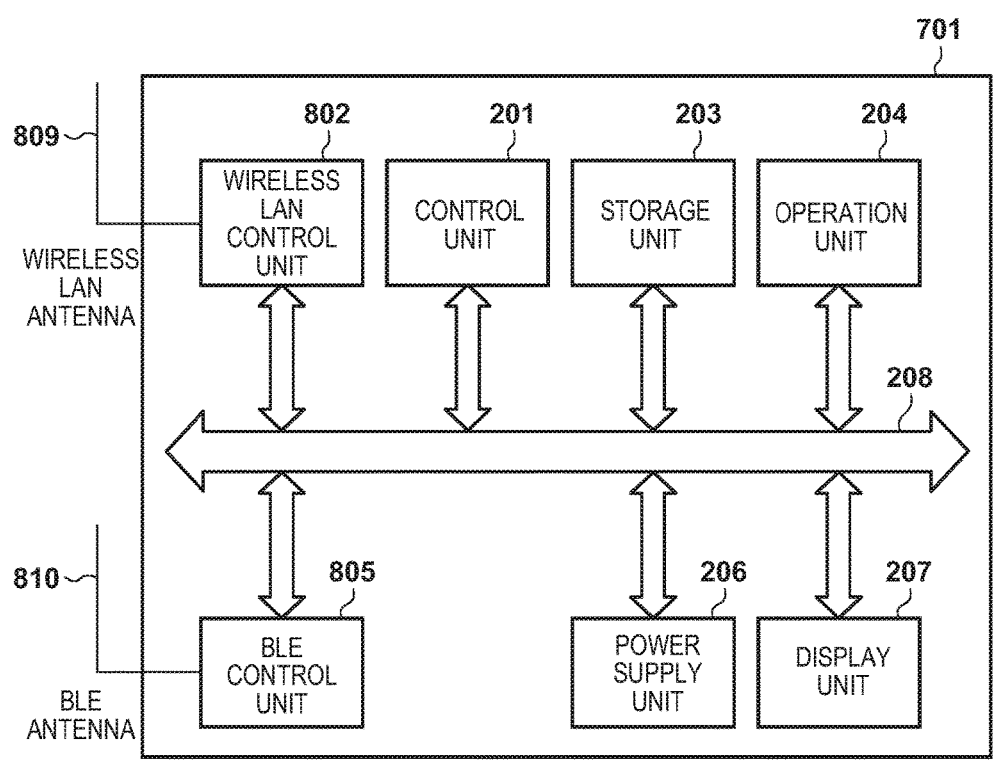
FIG. 8 is a block diagram showing an example of the hardware arrangement of a communication apparatus 701.

FIG. 8 is a block diagram showing an example of the hardware arrangement of the communication apparatus 701. A difference from FIG. 2 described in the first embodiment will be described below. A wireless LAN control unit 802 controls wireless communication performed via a wireless LAN antenna 809. The wired LAN control unit 802 may be an external device equipped by a USB or the like. A BLE control unit 805 controls BLE communication performed via a BLE antenna 810. The BLE control unit 805 may be an external device equipped by a USB or the like. In this embodiment, the communication apparatus 701 can perform communication by the wireless LAN and BLE. However, the communication apparatus 701 may include a control unit and an interface in order to perform communication by other wired and wireless methods such as a wired LAN, NFC, and public wireless.

(Functional Arrangement)

Figure 9:
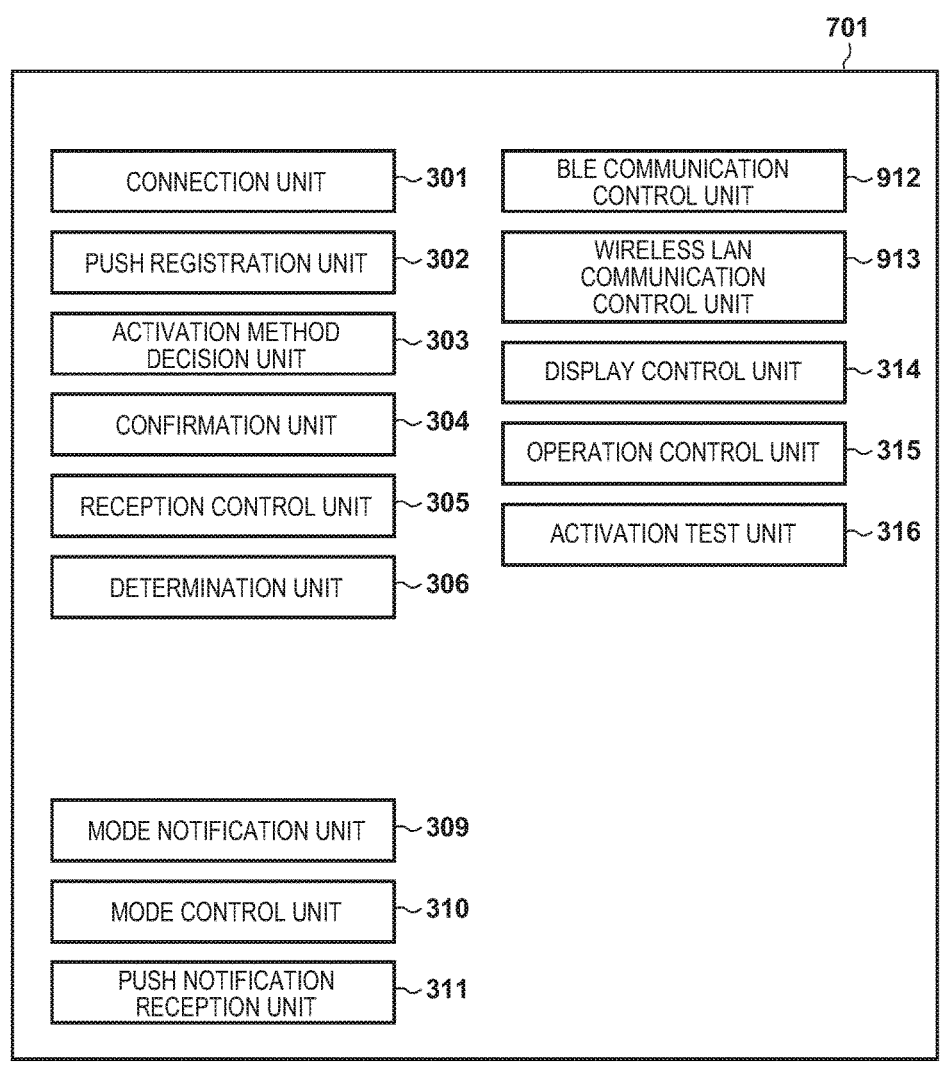
FIG. 9 is a block diagram showing an example of the functional arrangement of the communication apparatus 701.

FIG. 9 is a block diagram showing the functional arrangement of the communication apparatus 701. A difference from FIG. 3 described in the first embodiment will be described below. A BLE communication control unit 912 controls the BLE control unit 805 to perform BLE communication. A wireless LAN communication control unit 913 controls a wireless LAN control unit 802 to perform wireless LAN communication.

(Flowchart)

Figure 10:
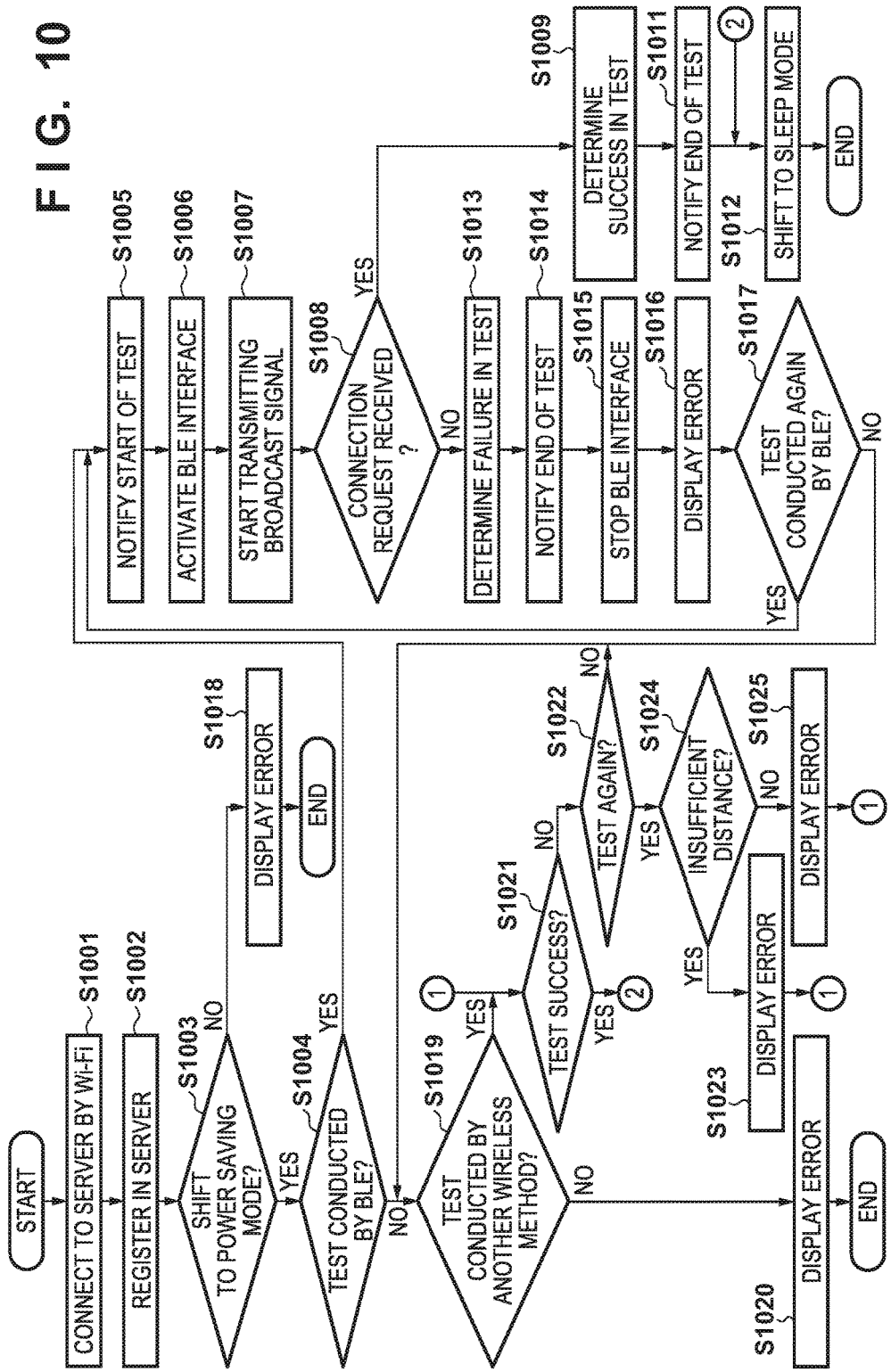
FIG. 10 shows an example of a flowchart of the communication apparatus 701.

An operation of the communication apparatus 701 will now be described in detail with reference to FIG. 10. FIG. 10 shows an example of a flowchart of the communication apparatus 701 according to this embodiment. Note that the flowchart will be described with reference to FIGS. 13A to 13F and FIGS. 14A to 14H as well. Each of FIGS. 13A to 13F and FIGS. 14A to 14H shows an example of a screen on a display unit 207 obtained by a display control unit 314.

Figure 14A:
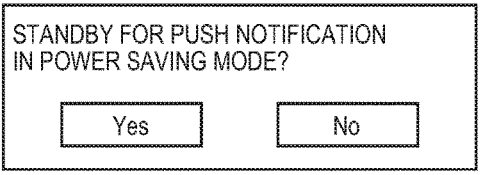
FIGS. 14A to 14H are views each showing an example of a screen on the display unit 207.
Figure 14F:
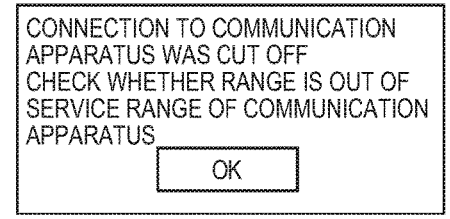
Figure 14B:
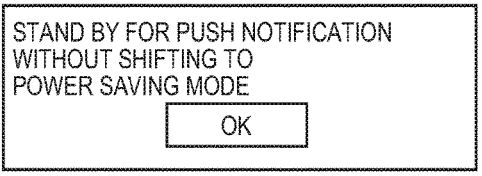

The communication apparatus 701 is connected to the server 102 by Wi-Fi (step S1001). The process in step S1002 is the same as that in step S401. In step S1003, a determination unit 306 determines whether to shift the communication apparatus 701 to a sleep mode and set it in a mode of receiving the push notification. That is, the determination unit 306 determines whether to shift the communication apparatus 701 to a power saving mode (sleep mode). Note that the power saving mode (sleep mode) is an operation mode lower than a normal operation mode in power consumption. That is, the communication apparatus 701 can switch between the first operation mode and the second operation mode (sleep mode) lower than the first operation mode in power consumption. A plurality of stages may be provided for the sleep mode depending on the amount of power consumption. The determination unit 306 may display, via the display control unit 314, a screen for prompting an input from a user on the display unit 207. FIG. 14A shows an example of a screen showing the display performed in step S1003. If the determination unit 306 determines that the communication apparatus 701 does not shift to the power saving mode (sleep mode) (No in step S1003), the display control unit 314 displays an error on the display unit 207 and terminates the process (step S1018). FIG. 14B shows an example of a screen showing the error displayed in step S1018. Note that if the user selects OK, a push notification reception unit 311 stands by in order to receive the push notification without causing a mode control unit 310 to shift the communication apparatus 701 to the power saving mode, that is, in a non-sleep mode. Note that in step S1018, the display control unit 314 may display another message on the display unit 207. The display unit 207 may display, for example, a message "if not shifting to the power saving mode, a time until a battery is dead is shortened".

Figure 14G:
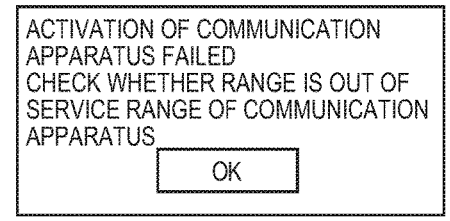
Figure 14C:
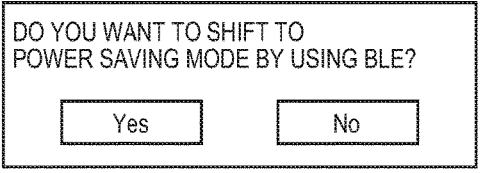

If the determination unit 306 determines that the communication apparatus 701 shifts to the power saving mode (Yes in step S1003), it determines whether to shift the communication apparatus 701 to the power saving mode by using BLE (step S1004). The determination unit 306 may display, via the display control unit 314, a screen for prompting an input from the user on the display unit 207. FIG. 14C shows an example of a screen showing the display performed in step S1004. Note that if the user selects Yes (Yes in step S1004), the determination unit 306 confirms whether it is possible to perform activation by using BLE. After the confirmation, an activation test unit 316 notifies the server 102 of the start of an activation test using BLE (step S1005). The BLE communication control unit 912 controls the BLE control unit 805 to activate a BLE interface (step S1006). The BLE communication control unit 912 starts to transmit a broadcast signal defined in a BLE specification (step S1007). The BLE communication control unit 912 stands by for a connection request from the server 102 (step S1008). The determination unit 306 determines whether the BLE communication control unit 912 can receive the connection request from the server 102.

If the BLE communication control unit 912 receives the connection request from the server 102 (Yes in step S1008), the determination unit 306 determines that the test succeeds (step S1009). The activation test unit 316 notifies the server 102 of the end of the test (step S1011). The mode control unit 310 shifts the communication apparatus 701 to the sleep mode (step S1012). Note that in this embodiment, the sleep mode refers to a mode in which power is supplied to at least the BLE control unit 805. In the sleep mode, the BLE communication control unit 912 may maintain a state in which it is connected to the server 102 by BLE or may transmit broadcast signals periodically.

If the BLE communication control unit 912 cannot receive the connection request (No in step S1008), the determination unit 306 determines that the activation test fails (step S1013). The determination unit 306 may also determine that the activation test fails if the communication apparatus 701 and the server 102 are at a distance farther apart than a connectable distance by BLE, or if it determines that a radio field intensity is low, and a packet is dropped midway even if they fall within a connectable range. The determination unit 306 measures the RSSI (Received Signal Strength Indicator) of the connection request and may determine, even if the BLE communication control unit 912 can receive the connection request, that the activation test fails because BLE connection may be cut off when the measured RSSI is smaller than a predetermined value.

Figure 13D:
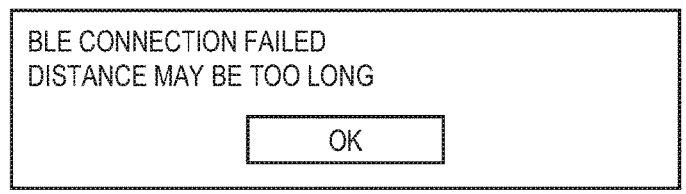

The activation test unit 316 notifies the server 102 of the end of the test (step S1014). The notification made by the activation test unit 316 may contain information indicating whether remote activation succeeds. The BLE communication control unit 912 stops the BLE interface (step S1015). The display control unit 314 displays an error on the display unit 207 (step S1016). FIG. 13D shows an example of a screen showing the error displayed in step S1016.

Figure 13E:
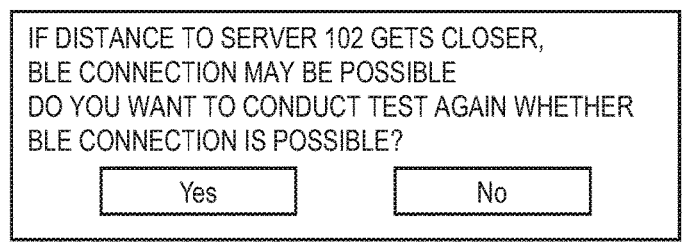

The activation test unit 316 determines whether to conduct the activation test again (step S1017). Note that the activation test unit 316 may display, via the display control unit 314, a screen for prompting an input from the user on the display unit 207 and determines, based on an input from the user in response to this, whether to conduct the activation test again. FIG. 13E shows an example of a screen showing the display performed in step S1017. Note that if the user selects Yes, the activation test unit 316 conducts the activation test again (Yes in step S1017). If the user selects No, the activation test unit 316 does not conduct the activation test (NO in step S1017).

Figure 13F:
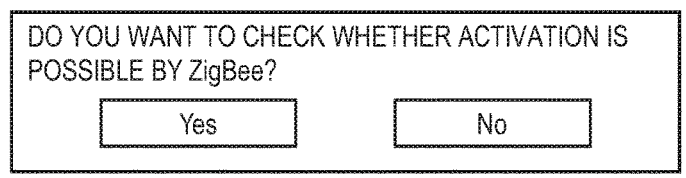

If No in step S1004, No in step S1017, or No in step S1022, the activation test unit 316 determines whether to conduct the test by using another wireless method, that is, an activation method different from that in the last time (step S1019). The activation test unit 316 may display, via the display control unit 314, a screen for prompting an input from the user on the display unit 207 and determine, based on an input from the user in response to this, whether to conduct the activation test by the other wireless method. FIG. 13F shows an example of a screen showing the display performed in step S1019. Note that if the user selects to conduct the activation test by ZigBee, the activation test unit 316 conducts the test by ZigBee. The example of the screen in FIG. 13F displays whether to conduct the activation test by ZigBee. However, the display unit 207 may display Wi-Fi, NFC, Wi-Fi Aware®, WoWLAN, or another wireless method. Note that a method of the activation test by these wireless methods is well known, and thus a description thereof will be omitted here. The communication apparatus 701 may further execute activation by applications utilizing the respective wireless methods. In this embodiment, the example by a wireless communication method has been described. However, the present invention is not limited to this. The present invention can also be implemented by another communication method such as optical communication or wired communication. The communication apparatus 701 may present a plurality of wireless methods to the user and prompt the user to select the method.

If the activation test unit 316 determines that the test is not conducted by the other wireless method (No in step S1019), it displays an error on the display unit 207 via the display control unit 314 (step S1020). FIG. 13A shows an example of a screen showing the error displayed in step S1020. If the user selects Yes, the push notification reception unit 311 stands by to receive the push notification without causing the mode control unit 310 to shift the communication apparatus 701 to the power saving mode, that is, in the non-sleep mode. If the user selects No, the push notification reception unit 311 terminates standby for receiving the push notification.

If the activation test unit 316 determines that the test is conducted by the other wireless method (Yes in step S1019), it conducts the activation test by the other wireless method and determines whether the activation test succeeds (step S1021). If the activation test unit 316 determines that the activation test succeeds (Yes in step S1021), the process advances to step S1012. If the activation test unit 316 determines that the activation test by the other wireless method fails (No in step S1021), it determines whether to conduct the activation test again (step S1022). The activation test unit 316 may decide, based on an input from the user, whether to conduct the activation test again.

Figure 14H:
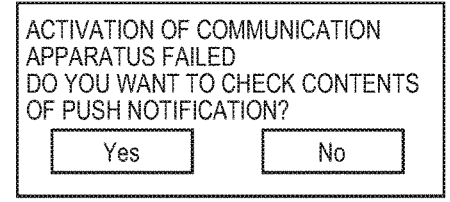
Figure 14D:
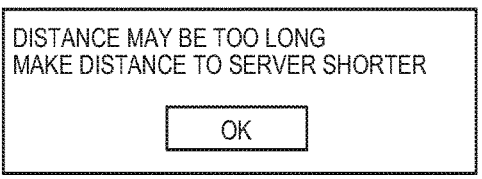

If the activation test unit 316 determines that the activation test is not conducted again (No in step S1022), the process advances to step S1019. The process in step S1019 is as described above. If the activation test unit 316 determines that the activation test is conducted again (Yes in step S1022), the process advances to step S1024. If the activation test unit 316 determines that failure in the test is caused by the fact that connection cannot be achieved because a distance to the server 102 is long (Yes in step S1024), the process advances to step S1023 in which it displays an error on the display unit 207 via the display control unit 314. FIG. 14D shows an example of a screen showing the error displayed in step S1023.

Figure 14E:
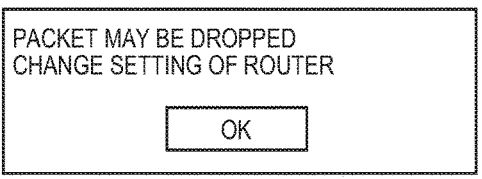

If the activation test unit 316 determines that the test fails even though the distance to the server is not long (No in step S1024), the process advances to step S1025 in which it displays an error on the display unit 207 via the display control unit 314. FIG. 14E shows an example of a screen showing the error displayed in step S1025. In this embodiment, the communication apparatus 701 treats, as errors, a case in which the distance is not sufficient and a case in which the packet is dropped. However, the present invention is not limited to these errors. The communication apparatus 701 may treat, as an error, another error that may be caused when remote activation is performed by an existing wireless method.

(Sequence Between Communication Apparatus 701 and Server 102)

Figure 11:
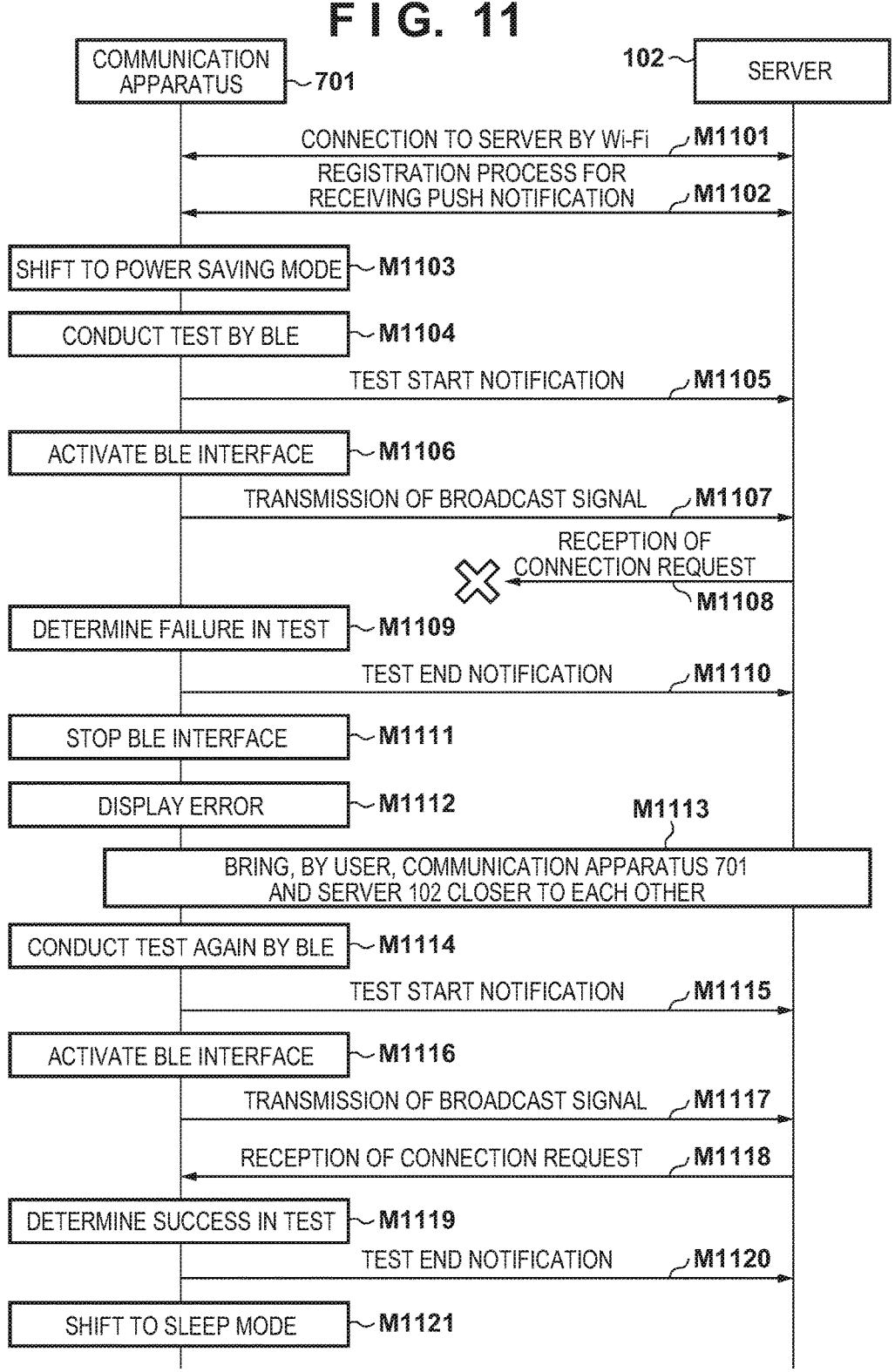
FIG. 11 is a chart showing an example of a sequence when an activation test succeeds according to the second embodiment.

Sequences between the communication apparatus 701 and the server 102 when the activation test succeeds/fails will now be described with reference to FIGS. 11 and 12. FIG. 11 is a chart showing an example of the sequence when the activation test succeeds. The process from M1101 to M1102 corresponds to the process from step S1001 to step S1002. M1103 corresponds to the process if it is determined Yes in step S1003. M1104 corresponds to the process if it is determined Yes in step S1004. The process from M1105 to M1107 corresponds to the process from step S1005 to step S1007. In M1108, the communication apparatus 701 cannot receive the connection request defined in the BLE specification because the distance between the communication apparatus 701 and the server 102 is long. M1109 is a process performed when the determination unit 306 determines No in step S1008, and the process advances to step S1013. The process from M1110 to M1112 corresponds to the process from step S1014 to step S1015.

M1112 corresponds to the process in step S1016. Note that as an error display, the fact that connection cannot be achieved because the distance is long is displayed as shown in FIG. 13D. The user brings the communication apparatus 701 and the server 102 closer to each other based on the error display in M1112. In M1114, the user performs an operation on the screen shown in, for example, FIG. 13E and conducts the activation test again by BLE. The process from M1115 to M1117 is the same as the process from M1105 to M1107. In M1118, a reception control unit 305 receives a BLE connection request. M1119 corresponds to the process in step S1009. The process from M1120 to M1121 corresponds to the process from S1011 to S1012.

Figure 12:
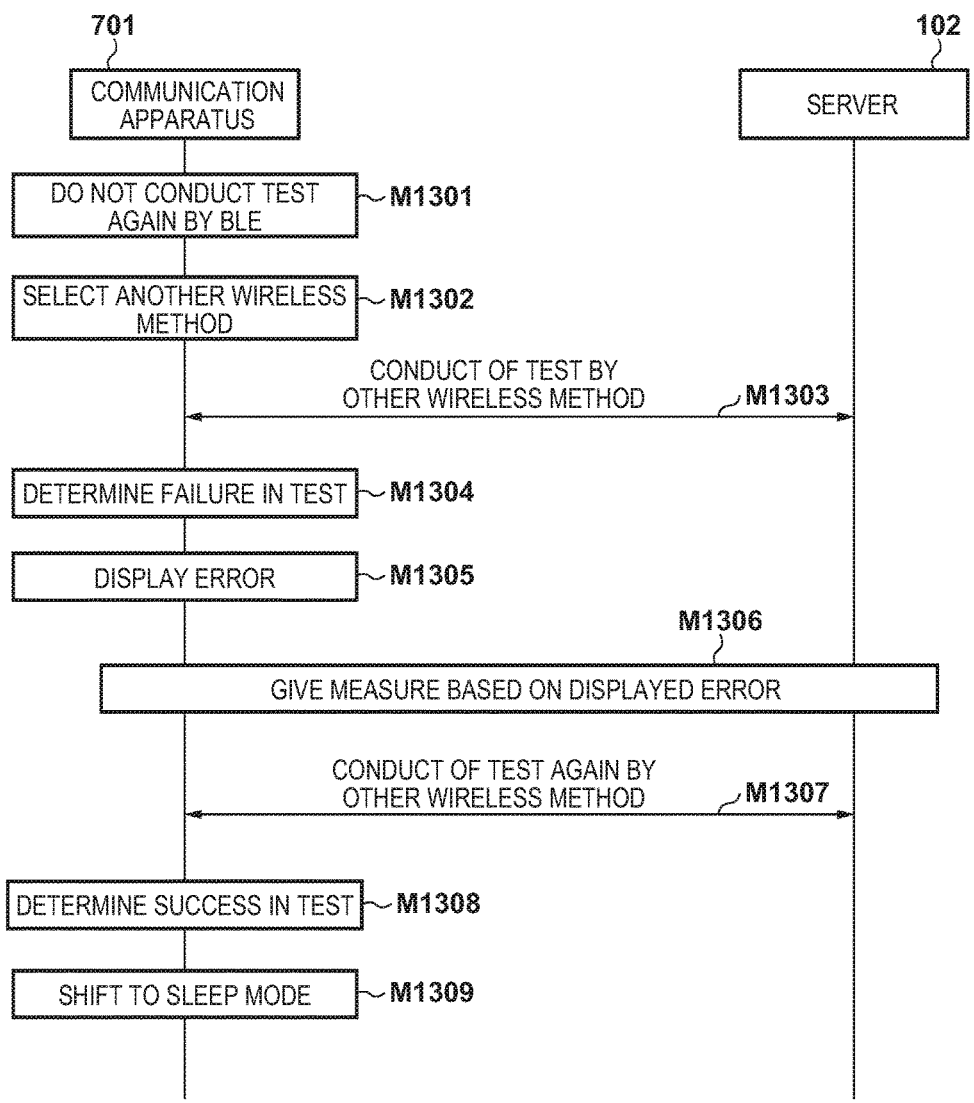
FIG. 12 is a chart showing an example of a sequence when the activation test fails according to the second embodiment.

FIG. 12 is a sequence chart when selecting not to conduct the activation test again (No in step S1017) after the activation test fails. M1301 corresponds to the process if it is determined No in step S1017. M1302 corresponds to the process if it is determined Yes in step S1019. In M1304, the communication apparatus 701 conducts, with the server 102, the activation test by another wireless method. A method of the activation test by the other wireless method is well known, and thus a description thereof will be omitted here. M1304 corresponds to the process if it is determined No in step S1021. M1305 corresponds to the process if it is determined Yes in step S1022. In M1306, the user gives a measure based on the error display. For example, if it is determined Yes in step S1024, the user brings the communication apparatus 701 and the server 102 closer to each other. If it is determined No in step S1025, the user changes the setting of a router between the communication apparatus 701 and the server 102 or replaces it with another router. In M1307, the communication apparatus 701 conducts the test again by another wireless method. M1308 corresponds to the process in step S1012.

In this embodiment, BLE has been described as the example. However, the present invention is not limited to this. ZigBee, Wi-Fi, NFC, Wi-Fi Aware®, WoWLAN, or another wireless method may be used. Further, in this embodiment, the communication apparatus 701 shifts to the sleep mode when activation by BLE succeeds. However, the present invention is not limited to this. The activation test may be conducted by a plurality of activation methods. For example, if the communication apparatus 701 includes a plurality of interfaces such as Wi-Fi and BLE, it can select a standby method having a high power saving effect. As a result, it is possible to further reduce power consumption.

If the communication apparatus 701 includes the plurality of interfaces, it can also select a standby method having a long connection distance. As a result, it is possible to decrease a possibility that connection is cut off by movement of the communication apparatus 701 or the server 102, or another factor. As a result, it is possible to increase a possibility that the communication apparatus 701 can be activated remotely. Even if the communication apparatus 701 includes, out of the plurality of interfaces, the interface that cannot be activated, the communication apparatus 701 can also increase the possibility that remote activation can be performed by using the other interface.

The communication apparatus 701 may display an error that the distance between the communication apparatus 701 and the server 102 may be long. As a result, it is possible to decrease a possibility that connection cannot be achieved and increase the possibility that remote activation can be performed. The communication apparatus 701 may also display an error that a packet may be dropped between the communication apparatus 701 and the server 102. As a result, the user can remove the router or the like between the communication apparatus 701 and the server 102, or change the setting of the router or the like. This makes it possible to decrease a possibility that the packet is dropped and increase the possibility that remote activation can be performed. As described above, it is possible to achieve both power savings and convenience in this embodiment.

Third Embodiment

Figure 15:
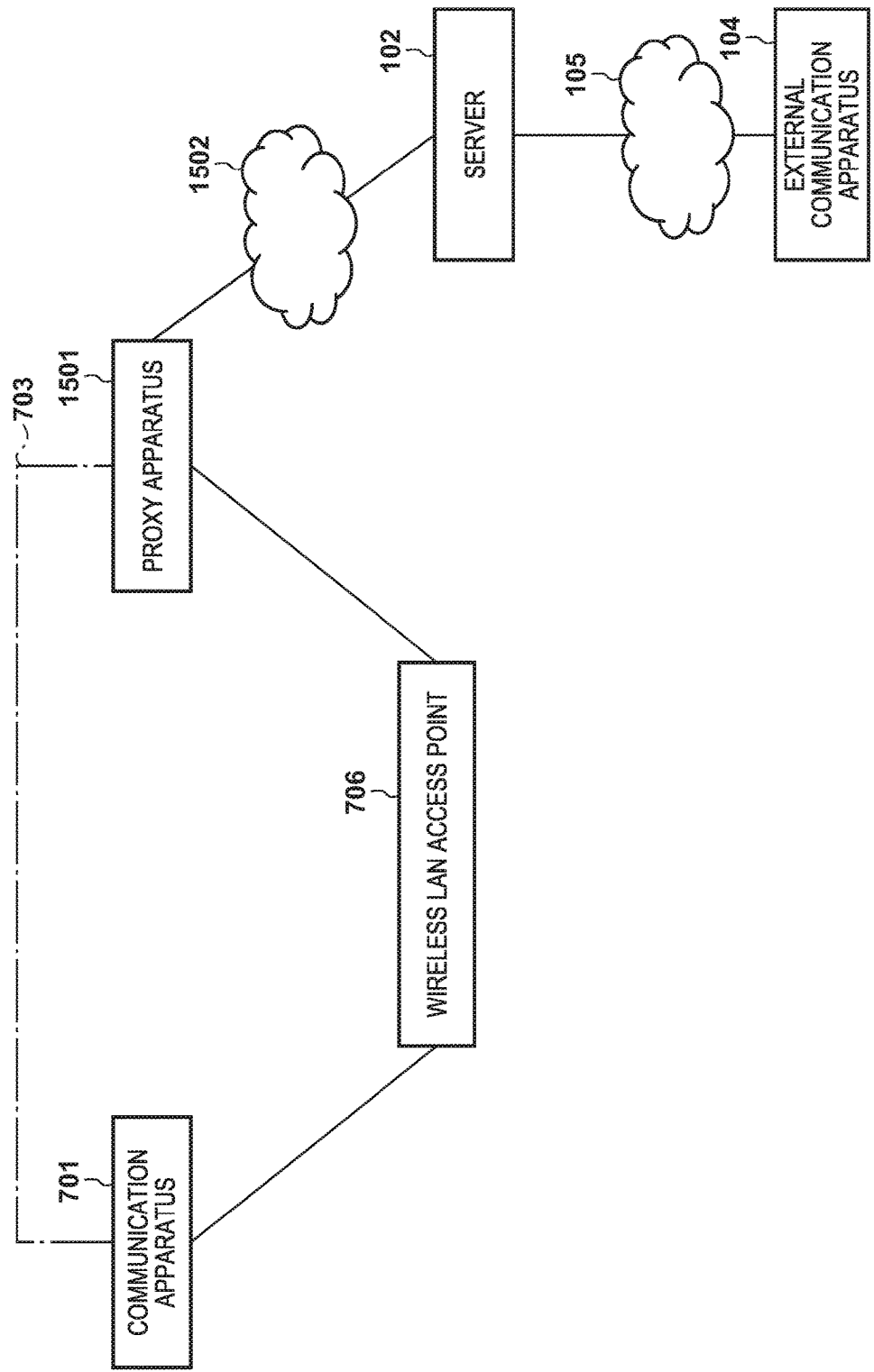
FIG. 15 is a schematic view showing a system arrangement according to the third embodiment.

FIG. 15 is a schematic view showing a system arrangement according to the third embodiment. A difference from FIG. 7 described in the second embodiment will be described below. In this embodiment, a proxy apparatus 1501 can communicate with a communication apparatus 701 and a server 102. The proxy apparatus 1501 is connected to the server 102 instead of the communication apparatus 701 and receives a push notification (message) addressed to the communication apparatus 701. Triggered by receiving the push notification from the server 102, the proxy apparatus 1501 activates the communication apparatus 701 remotely and transmits the received push notification.

In this embodiment, the communication apparatus 701 conducts an activation test with the proxy apparatus 1501. Therefore, the proxy apparatus 1501 has a function of conducting the activation test and a function of performing remote activation, both of which are included in the server 102. In this embodiment, configuration may be such that the proxy apparatus 1501 does not perform a proxy process of a protocol session for the communication apparatus 701 to receive the push notification.

The proxy apparatus 1501 is a device such as a digital camera, a projector, a monitoring camera, a digital video camera, an MFP, or a printer and communicates with the communication apparatus 701 via a wireless LAN access point 706. In this embodiment, the proxy apparatus 1501 communicates with the communication apparatus 701 via the wireless LAN access point 706. However, the proxy apparatus 1501 may be connected to the communication apparatus 701 directly. The proxy apparatus 1501 may be an apparatus such as a smartphone, a tablet, or a PC, or may be an application or a Web browser operating on these apparatuses. The proxy apparatus 1501 may be implemented by a combination of a plurality of apparatuses and a server, service, or the like.

In this embodiment, the proxy apparatus 1501 is connected, by a wired LAN, to the server 102 via a network 1502. Note that the network 1502 can also be implemented by a network such as the Internet, a WAN (Wide Area Network), or a LAN (Local Area Network), or a combination of these. The network 1502 can also be implemented by a combination of, for example, a wireless LAN, wireless ad hoc network, wired LAN, BLE, ZigBee®, UWB (Ultra Wide Band), Wi-Fi Aware®, 3GPP, LTE (Long Term Evolution), public wireless, USB, or NFC (Near Field Communication) and other wired and wireless methods.

The proxy apparatus 1501 utilizes BLE connection 703 to communicate with the communication apparatus 701 in BLE communication. In this embodiment, the proxy apparatus 1501 and the communication apparatus 701 can perform communication via BLE. However, the present invention is not limited to this. They may perform communication by ZigBee®, NFC, Wi-Fi Aware®, or the like.

(Hardware Arrangement)

Figure 16:
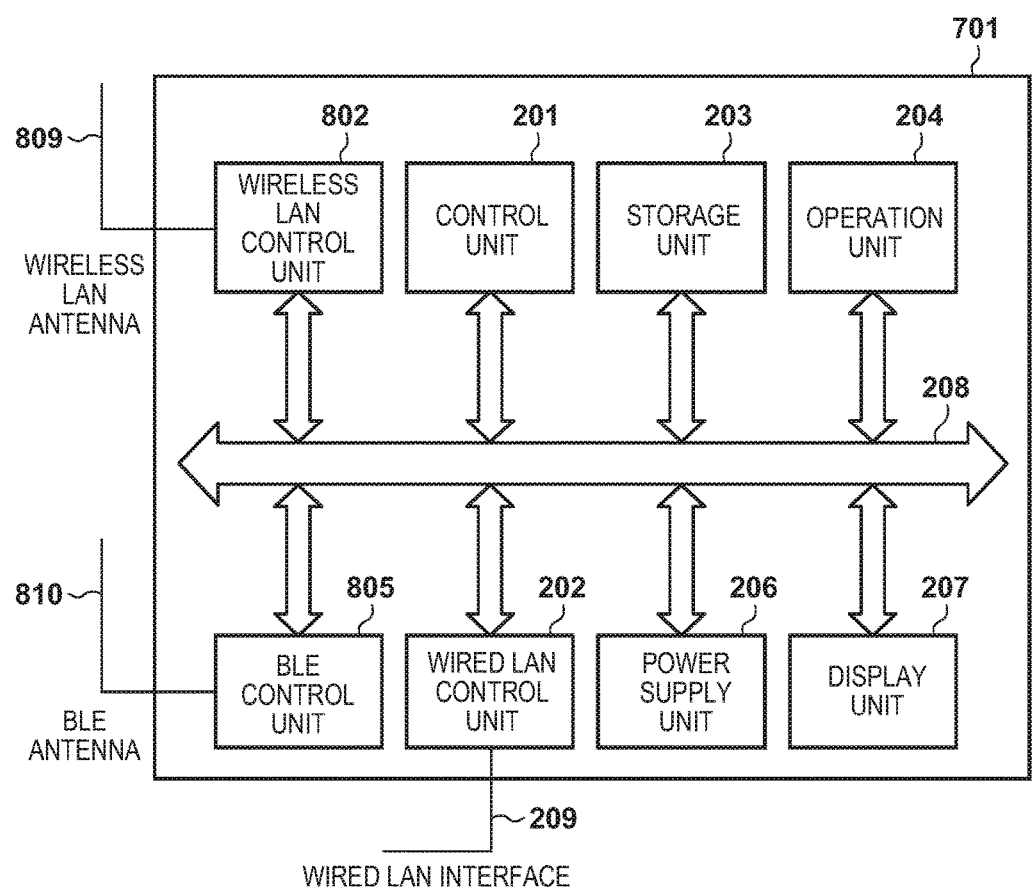
FIG. 16 is a block diagram showing an example of the hardware arrangement of a proxy apparatus 1501.

FIG. 16 is a block diagram showing an example of the hardware arrangement of the proxy apparatus 1501. Respective components included in FIG. 16 are the same as those shown in FIGS. 2 and 8, and thus a description thereof will be omitted.

(Functional Block)

Figure 17:
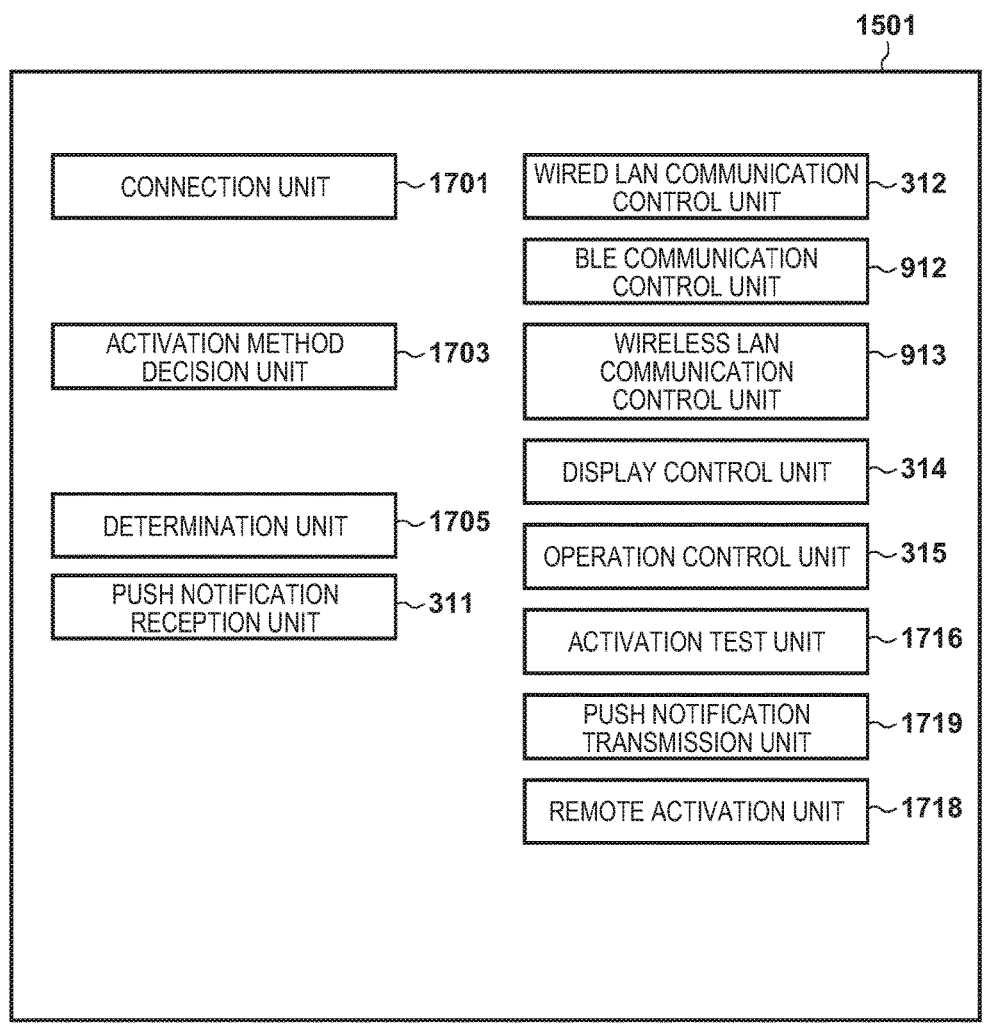
FIG. 17 is a block diagram showing an example of the functional arrangement of the proxy apparatus 1501.

FIG. 17 is a block diagram showing an example of the functional arrangement of the proxy apparatus 1501. A difference from FIG. 9 described in the second embodiment will be described below. A connection unit 1701 is connected to the communication apparatus 701 via a wireless LAN communication control unit 913. An activation method decision unit 1703 decides an activation method of activating the communication apparatus 701 remotely. A determination unit 1705 determines whether a remote activation test of the communication apparatus 701 succeeds. The determination unit 1705 also determines whether remote activation of the communication apparatus 701 succeeds. An activation test unit 1716 conducts the remote activation test of the communication apparatus 701. A push notification transmission unit 1719 transmits, to the communication apparatus 701, a push notification received by a push notification reception unit 311 from the server 102. When the push notification reception unit 311 receives the push notification from the server 102, a remote activation unit 1718 activates the communication apparatus 701 remotely.

(Flowchart)

Figure 18:
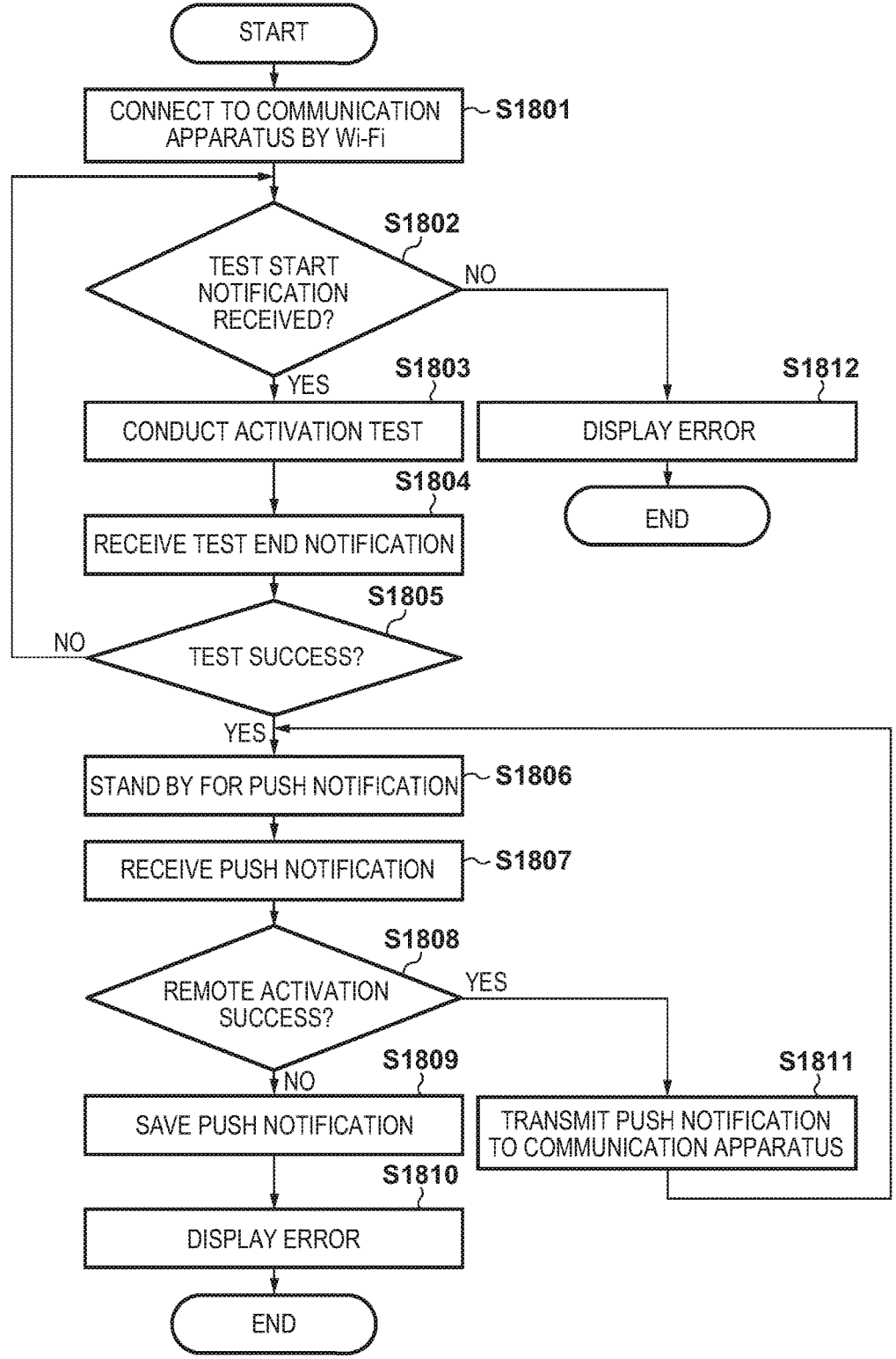
FIG. 18 shows an example of a flowchart of the proxy apparatus 1501.

An operation of the proxy apparatus 1501 will now be described in detail with reference to FIG. 18. FIG. 18 shows an example of a flowchart of the proxy apparatus 1501. The connection unit 1701 communicates with the communication apparatus 701 via a wireless LAN communication control unit 913 (step S1801). When a notification of the start of the activation test is received from the communication apparatus 701 (Yes in step S1802), the activation test unit 1716 starts a test for determining whether the communication apparatus 701 can be activated remotely (step S1803). A communication method used for remote activation includes BLE, ZigBee®, Wi-Fi, NFC, Wi-Fi Aware®, WoWLAN, or another wireless method. However, the present invention is not limited to these. A method of the activation test by these wireless methods is well known, and thus a description thereof will be omitted here. If No in step S1802, a display control unit 314 of the proxy apparatus 1501 displays an error on a display unit 207 in step S1812, and then the process on this flowchart ends. FIG. 14F shows an example of a screen showing the error displayed in step S1812.

The activation test unit 1716 receives a test end notification from the communication apparatus 701 (step S1804). The test end notification received by the activation test unit 1716 can contain information indicating whether remote activation succeeds. The determination unit 1705 determines, based on the test end notification, whether the test succeeds, that is, whether remote activation succeeds (step S1805). Note that the determination unit 1705 may determine whether remote activation succeeds from the notification received in step S1804 or may determine whether connection to the communication apparatus 701 can be performed by the method used for remote activation in step S1803. A method of determining whether remote activation succeeds is not limited to these.

If the determination unit 1705 determines that remote activation fails (No in step S1805), the process returns to step S1802. If the determination unit 1705 determines that remote activation succeeds (Yes in step S1805), the push notification reception unit 311 is connected to the server 102 and starts to stand by for the push notification (step S1806). The activation method decision unit 1703 decides a method by which the test succeeds as an activation method of activating the communication apparatus 701.

The push notification reception unit 311 establishes connection of an HTTP/2 with the server 102 when using the HTTP/2. A push registration unit 302 transmits a stream reservation request (PUSH_PROMISE frame) for receiving the push notification on the connection. When transmitting the push notification, the server 102 utilizes a stream reserved by the reservation request to transmit the push notification. The push notification reception unit receives the push notification in step S1807. When using the HTTP/2 to receive the push notification, the push notification reception unit 311 uses the stream reserved by the reservation request to receive the push notification from the server 102.

The remote activation unit 1718 activates the communication apparatus 701 remotely (step S1808). If the remote activation unit 1718 succeeds in remote activation of the communication apparatus 701 (Yes in step S1808), the push notification transmission unit 1719 transmits the push notification received in step S1807 to the communication apparatus 701. If the remote activation unit 1718 fails in remote activation of the communication apparatus 701 (No in step S1808), the push notification reception unit 311 saves the received push notification in a storage unit 203 (step S1810). If it is determined that the remote activation unit 1718 fails in remote activation, it displays an error on the display unit 207 via the display control unit 314. FIG. 14G shows an example of a screen showing the error displayed in step S1810. In this embodiment, a display method by a GUI is used. However, the present invention is not limited to this. A method by flashing of an LED, an image, a sound, a vibration, or a message may be used. The remote activation unit 1718 may display, via the display control unit 314, a screen for prompting an input from the user on the display unit 207. FIG. 14H shows an example of a screen for prompting the input from the user. Note that if the user selects Yes, the display control unit 314 may display contents of the push notification on the display unit 207.

Conditions for determining that the remote activation unit 1718 fails in remote activation include the facts that wireless connection which performs remote activation is cut off, the communication apparatus 701 does not react even though packets are transmitted a predetermined number of times, and the like. However, the present invention is not limited to these. When there are a plurality of remote activation methods, it may be determined that the remote activation unit 1718 fails in remote activation if activation by the plurality of methods fails.

(Sequence among Communication Apparatus 701, Proxy Apparatus 1501, and Server 102)

A sequence among the communication apparatus 701, the proxy apparatus 1501, and the server 102 when remote activation succeeds will now be described with reference to FIG. 19 in a case in which remote activation succeeds. FIG. 19 is a chart showing an example of the sequence when remote activation succeeds. In this embodiment, the proxy apparatus 1501 has a function of conducting the activation test which is conducted by the server 102 in FIG. 11 described in the second embodiment.

The process from M1103 to M1121 is performed by replacing the server 102 in FIG. 11 with the proxy apparatus 1501. The proxy apparatus 1501 conducts the activation test with the communication apparatus 701. In M1901, the proxy apparatus 1501 determines that the communication apparatus 701 can be activated remotely (Yes in step S1805). In M1902, the proxy apparatus 1501 is connected to the server 102 and starts to stand by for the push notification addressed to the communication apparatus 701. In M1903, the server 102 transmits, to the proxy apparatus 1501, the push notification addressed to the communication apparatus 701. In M1904, the proxy apparatus 1501 activates the communication apparatus 701 remotely. In M1905, the proxy apparatus 1501 determines that remote activation of the communication apparatus 701 succeeds. In M1906, the proxy apparatus 1501 transmits the push notification to the communication apparatus 701. If remote activation of the communication apparatus 701 fails in M1904, the proxy apparatus 1501 determines failure in remote activation in M1905. Then, the push notification reception unit 311 saves the received push notification in the storage unit 203.

In this embodiment, standby for the push notification is started if remote activation succeeds. However, the present invention is not limited to this. The remote activation test may be conducted by a plurality of methods. If the remote activation test is conducted by the plurality of activation methods, the plurality of methods can be used to activate the communication apparatus 701. This makes it possible to increase a probability that the communication apparatus 701 can be activated remotely.

When the plurality of remote activation methods are registered, priorities may be set. For example, if a method having less power consumption is given a higher priority, the remote activation method having lower power consumption is prioritized. This makes it possible to further reduce power consumption. Alternatively, a method having a wider range capable of wireless connection is given a higher priority, a possibility that connection is cut off by moving the communication apparatus 701 or the proxy apparatus 1501 is decreased. As a result, a probability of success in remote activation of the communication apparatus 701 can be increased.

According to each embodiment described above, the communication apparatus conducts the activation test with a communication partner apparatus before receiving the push notification. If this activation test succeeds, the communication apparatus is set in the sleep mode. On the other hand, if the test fails, the user improves environment to conduct the activation test again, or the communication apparatus is set in the non-sleep mode. That is, the communication apparatus is determined whether it can be activated remotely in advance and is shifted to a mode in accordance with the determination, or the user improves environment such that remote activation can be performed. This makes it possible to increase a possibility that the communication apparatus can be recovered from the sleep mode when activated from the remote site.

Note that in each embodiment described above, the activation test is conducted when a condition for causing the communication apparatus to transit to the sleep mode holds, and the communication apparatus is caused to transit to the sleep mode if it can return to the sleep mode. However, the present invention is not limited to this. For example, when the condition for causing the communication apparatus to transit to the sleep mode holds, a special activation test need not be conducted if it is determined that the communication apparatus can be recovered from the sleep mode within a predetermined time or when the state such as the position of the communication apparatus does not change.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-203985, filed Oct. 15, 2015, which is hereby incorporated by reference herein in its entirety.

What is claimed is:

1. A communication apparatus, comprising:
a memory that stores instructions; and
a processor that executes the instructions to:
transmit, to another communication apparatus, a notification for requesting the another communication apparatus to transmit a predetermined packet, wherein the predetermined packet is used by the communication apparatus for changing an operation mode of the communication apparatus from a first operation mode to a second operation mode higher than the first operation mode in power consumption;
determine, in a case where the predetermined packet is received from the another communication apparatus during a predetermined time period according to the notification, the first operation mode as an operation mode to be set to the communication apparatus after the predetermined time period; and
set the operation mode of the communication apparatus to the first operation mode according to such a determination.

2. The apparatus according to claim 1, wherein, in a case where the predetermined packet is not received from the another communication apparatus during the predetermined time period, the second operation mode is determined as the operation mode to be set to the communication apparatus later than the predetermined time period.

3. The apparatus according to claim 1, wherein the processor executes the instructions to transmit to the another communication apparatus a second notification for requesting the another communication apparatus to transmit a second packet which is used by the communication apparatus for changing an operation mode of the communication apparatus from the first operation mode to the second operation mode in a case where the predetermined packet is not received during the predetermined time period, and wherein, in a case where the second packet is received from the another communication apparatus during a second predetermined time period according to transmitting of the second notification, the first operation mode is determined as the operation mode to be set to the communication apparatus later than the second predetermined time period.

4. The apparatus according to claim 3, wherein the predetermined packet is a packet according to a first wireless communication protocol and the second packet is a packet according to a second wireless communication protocol which is different from the first wireless communication protocol.

5. The apparatus according to claim 1, wherein the notification includes information related to a start of the predetermined time period.

6. The apparatus according to claim 1, wherein the processor executes the instructions to further notify the another communication apparatus of an end of the predetermined time period in a case where the predetermined packet is received from the another communication apparatus during the predetermined time period according to the notification, and after a notification of the end, switches the operation mode of the communication apparatus from the second operation mode to the first operation mode.

7. The apparatus according to claim 1, wherein the processor executes the instructions to notify a user of an error in a case where the predetermined packet is not received from the another communication apparatus during the predetermined time period according to the notification.

8. The apparatus according to claim 1, wherein the predetermined packet is pushed by the another communication apparatus.

9. The apparatus according to claim 1, wherein the another communication apparatus comprises a proxy apparatus connected to a server apparatus capable of transmitting a push notification to the communication apparatus.

10. The apparatus according to claim 1, wherein the notification includes count information indicating the number of times the another communication apparatus transmits the predetermined packets, and in a case where at least one of the predetermined packets is received from the another communication apparatus during the predetermined time period according to the notification, the first operation mode is determined as an operation mode to be set to the communication apparatus later than the predetermined time period.

11. The apparatus according to claim 1, wherein the predetermined period is started by transmitting the notification to the another communication apparatus.

12. The apparatus according to claim 1, wherein the processor executes the instructions to select an activation method from among a plurality of activation methods, and the processor executes the instructions to transmit the notification according to the activation method that is selected.

13. A method of controlling a communication apparatus, the method comprising the steps of:
  transmitting, to another communication apparatus, a notification for requesting the another communication apparatus to transmit a predetermined packet, wherein the predetermined packet is used by the communication apparatus for changing an operation mode of the communication apparatus from a first operation mode to a second operation mode higher than the first operation mode in power consumption; and
  determining, in a case where the predetermined packet is received from the another communication apparatus during a predetermined time period according to the notification, the first operation mode as an operation mode to be set to the communication apparatus after the predetermined time period; and
  setting the operation mode of the communication apparatus to the first operation mode according to a result of the determination.

14. A non-transitory computer-readable storage medium storing a computer program for causing a computer to execute a control method of a communication apparatus, the method comprising:
  transmitting, to another communication apparatus, a notification for requesting the another communication apparatus to transmit a predetermined packet, wherein the predetermined packet is used by the communication apparatus for changing an operation mode of the communication apparatus from a first operation mode to a second operation mode higher than the first operation mode in power consumption; and
  determining, in a case where the predetermined packet is received from the another communication apparatus during a predetermined time period according to the notification, the first operation mode as an operation mode to be set to the communication apparatus after the predetermined time period; and
  setting the operation mode of the communication apparatus to the first operation mode according to a result of the determination.

* * * * *